United States Patent
Sakurai et al.

(10) Patent No.: US 9,598,098 B2
(45) Date of Patent: Mar. 21, 2017

(54) STEERING WHEEL

(71) Applicant: TOYODA GOSEI CO., LTD., Kiyosu-shi, Aichi-ken (JP)

(72) Inventors: Koji Sakurai, Kiyosu (JP); Norio Umemura, Kiyosu (JP); Naoki Tsukamoto, Kiyosu (JP); Hisatoshi Ota, Kiyosu (JP); Kenji Onda, Kiyosu (JP); Kenichi Matsui, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 138 days.

(21) Appl. No.: 14/645,816

(22) Filed: Mar. 12, 2015

(65) Prior Publication Data

US 2016/0023667 A1 Jan. 28, 2016

(30) Foreign Application Priority Data

Jul. 25, 2014 (JP) .................. 2014-152418

(51) Int. Cl.
*B62D 1/04* (2006.01)
*B60W 50/16* (2012.01)

(52) U.S. Cl.
CPC ............... *B62D 1/04* (2013.01); *B60W 50/16* (2013.01)

(58) Field of Classification Search
CPC ... B62D 1/04; B62D 1/08; B62D 1/11; B62D 15/029; H02K 7/063; H02K 7/075; B60W 50/16
See application file for complete search history.

(56) References Cited

U.S. PATENT DOCUMENTS

| 5,107,155 | A | * | 4/1992 | Yamaguchi | ............ | H02K 7/063 |
|---|---|---|---|---|---|---|
| | | | | | | 310/81 |
| 7,852,225 | B2 | | 12/2010 | Lemasson | | |
| 7,902,987 | B2 | * | 3/2011 | Lemasson | ............ | B60W 50/16 |
| | | | | | | 340/407.1 |
| 8,269,614 | B2 | * | 9/2012 | Kerstan | ................ | B60W 50/16 |
| | | | | | | 340/407.1 |

(Continued)

FOREIGN PATENT DOCUMENTS

| DE | 102010047160 | * | 4/2012 | ............ B62D 1/046 |
|---|---|---|---|---|
| EP | 0856432 A2 | | 8/1998 | |

(Continued)

*Primary Examiner* — Adam D Rogers
(74) *Attorney, Agent, or Firm* — Posz Law Group, PLC

(57) ABSTRACT

A steering wheel provided with a vibration device. The vibration device includes a vibration motor with a weight attached to a rotational axis protruding out of a motor body, a mounting bracket which mounts the motor on the steering wheel body, a circuit substrate which includes a connector for feeding the vibration motor with electricity and a terminal which is plugged in a terminal hole of a mounting base of the motor body such that the circuit substrate is connected to the motor body, and a clip which is assembled with the motor body and mounted on the mounting bracket together with the motor body. The clip includes a pressing section which presses the circuit substrate against the motor body and a retaining element that is engaged with and holds the mounting bracket so as to help the pressing section to keep pressing the circuit substrate toward the motor body.

5 Claims, 17 Drawing Sheets

(56) References Cited

U.S. PATENT DOCUMENTS

| | | | | |
|---|---|---|---|---|
| 8,421,289 | B2* | 4/2013 | Hara | H02K 5/04 |
| | | | | 310/81 |
| 9,278,705 | B2* | 3/2016 | Murata | B60Q 9/00 |
| 9,340,153 | B2* | 5/2016 | Kim | B60W 50/14 |
| 2015/0307022 | A1* | 10/2015 | Nelson | B62D 1/046 |
| | | | | 701/36 |
| 2016/0023677 | A1* | 1/2016 | Sakurai | B62D 1/046 |
| | | | | 74/552 |
| 2016/0114826 | A1* | 4/2016 | Moinard | B62D 1/046 |
| | | | | 74/552 |
| 2016/0129860 | A1* | 5/2016 | Moinard | B62D 1/04 |
| | | | | 74/552 |

FOREIGN PATENT DOCUMENTS

| | | | |
|---|---|---|---|
| FR | WO 2008123804 A1 * | 10/2008 | B60K 28/066 |
| JP | 2004-537452 A | 12/2004 | |
| JP | 2009-132359 A | 6/2009 | |
| JP | 2009-151775 A | 7/2009 | |
| JP | 2010-241327 A | 10/2010 | |
| JP | 2013-244767 A | 12/2013 | |
| WO | 03/012557 A2 | 2/2003 | |

\* cited by examiner

STEERING WHEEL

CROSS REFERENCE TO RELATED APPLICATIONS

The Present application claims priority from Japanese Patent Application No. 2014-152418 of Sakurai et al., filed on Jul. 25, 2014, the disclosure of which is hereby incorporated into the present application by reference.

BACKGROUND OF THE INVENTION

1. Field of the Invention

The present invention relates to a steering wheel provided with a vibration device that transmits vibration to the driver holding a ring section of the steering wheel.

2. Description of Related Art

U.S. Pat. No. 7,852,225 discloses a steering wheel which is equipped with a vibration device which causes vibration on a ring section of the steering wheel to warn the driver holding the ring section in such an instance where his vehicle is about to leave the lane. In this steering wheel, the vibration device is mounted on a spoke region of a core of the steering wheel. The vibration device includes a vibration motor and a fixing bracket which mounts the vibration motor on the spoke region of the core. The vibration motor includes a rotational axis protruding out of a motor body and an eccentric weight connected to the rotational axis. The fixing bracket includes a holding section which holds end sections of the vibration motor from which the rotational axis protrudes and mounting sections which extend from opposite sides of the holding section and are secured to the core of the steering wheel.

In such a steering wheel with a vibration device, it is preferable, in light of downsizing of the vibration device, that a vibration motor of the vibration device is provided with a circuit substrate having a connector to which a lead wire is connected for supplying an electricity to the vibration device. That is, if a circuit substrate having a connector is connected to a motor body of the vibration device with its terminals for supplying an electricity plugged in terminal holes of the motor body, the lead wire can be connected to the connector of the circuit substrate of the vibration device, which will facilitate wiring of the lead wire and mounting of the vibration device on a steering wheel body.

A circuit substrate is preferably connected to the motor body also because such a circuit substrate may include an IC chip for removing such an electric noise that would arise at actuation of the vibration motor and affect electronic devices of a vehicle.

However, it is not preferable to use such fixing means as a screw for mounting the circuit substrate on the motor body because such configuration would complicate the connecting work of the circuit substrate and assembling of the vibration device.

SUMMARY OF THE INVENTION

An object of the present invention is to provide a steering wheel in which a mounting of a vibration device is very simple and so is an assembling of the vibration device.

The steering wheel of the invention includes a steering wheel body provided with a ring section for holding for steering and a vibration device that transmits vibration to a driver holding the ring section. The vibration device includes a vibration motor, a mounting bracket, a circuit substrate and a clip.

The vibration motor includes a motor body, a rotational axis protruding out of the motor body and an eccentric weight attached to the rotational axis. The motor body includes a mounting base provided with a terminal hole.

The mounting bracket holds the motor body and mounts the vibration motor on a mounting section of the steering wheel body.

The circuit substrate includes a connector to which a lead wire is connected for feeding the vibration motor with an electric power and a terminal which is plugged in the terminal hole of the mounting base of the motor body such that the circuit substrate is connected to the mounting base of the motor body.

The clip is mounted on the motor body and assembled with the mounting bracket together with the motor body. The clip includes a pressing section which presses the circuit substrate against the motor body and a retaining element which is engaged with and holds either the mounting bracket or motor body so as to help the pressing section to keep pressing the circuit substrate toward the motor body.

With the steering wheel of the invention, when the vibration device is assembled, the circuit substrate is firstly connected to the mounting base of the motor body with the terminal of the circuit substrate plugged in the terminal hole of the mounting base of the motor body. Then if the clip is mounted on the motor body such that the pressing section abuts against the circuit substrate, and the motor body and the clip are assembled with the mounting bracket, the retaining element of the clip is engaged with and holds the mounting bracket or motor body so as to help the pressing section to keep pressing the circuit substrate. Accordingly, the assembling of the vibration device will be completed without a fear of disengagement of the circuit substrate from the motor body.

That is, assembling of the vibration device can be conducted in a simple fashion only by connecting the circuit substrate to the motor body, mounting the clip on the motor body, and then mounting the mounting bracket with the clip on the motor body, with the circuit substrate kept attached to the motor body without such fixing means as a screw.

The vibration device assembled as described above can be mounted on the steering wheel body by mounting the mounting bracket on the mounting section of the steering wheel body. Since the circuit substrate connected to the motor body is provided with a connector, a lead wire has only to be connected to the connector, thus the wiring of the lead wire will be simple as well as the mounting of the vibration device on the steering wheel body.

Therefore, the steering wheel of the invention will facilitate the mounting of the vibration device on the steering wheel body as well as the assembling of the vibration device.

It will be appreciated that the circuit substrate may preferably be provided with an IC chip for removing an electric noise which would arise at actuation of the vibration motor and affect electronic devices mounted on the steering wheel.

In the steering wheel described above, it is desired that the clip is composed of a flat spring material, and that the pressing section is a holding stop which presses the circuit substrate in a direction that the terminal of the circuit substrate is inserted into the terminal hole, while the retaining element is a retaining pawl which holds a retained region of the mounting bracket in a direction against the direction that the holding stop presses the circuit substrate.

With this configuration, if the clip is mounted on the motor body, the holding stop as the pressing section is located at a position to press the circuit substrate in a direction that the terminal of the circuit substrate is inserted into the terminal hole. Then if the clip and the motor body are assembled with the mounting bracket, the retaining pawl as the retaining element of the clip holds the mounting bracket in a direction against the direction that the holding stop presses the circuit substrate. At this time, since the clip is composed of a flat spring plate material, the holding stop is elastically deformed so as to press the circuit substrate against an unplug-direction of the terminal out of the terminal hole, thus prevent the circuit substrate from being disengaged from the motor body smoothly. Further, the clip will also be prevented from being disengaged from the mounting bracket and steadily assembled with the mounting bracket due to a repulsive force of the holding stop and retention by the retaining pawl.

It is further desired in the above steering wheel that:

the clip further includes a pair of assembling plate sections that are opposed to each other and abut against opposite end planes of the motor body opposing in a direction of the rotational axis of the vibration motor and a connection plate section that connects the assembling plate sections together and covers the circuit substrate, thus the clip has a generally U-shaped sectional shape;

the motor body includes on each of the end planes a projected section;

the holding stop is formed on each of the assembling plate section in such a manner as to abut against opposite edges of the circuit substrate connected to the mounting base;

each of the assembling plate sections includes an assembling recess that receives the projected section of the motor body from an opening of the assembling recess provided on a side facing away from the connection plate section;

the retaining pawl is formed in a periphery of the opening of each of the assembling recesses;

the mounting bracket includes a holding section that holds the motor body and has a U-shaped sectional shape and a pair of mounting tongues that extend from opposite ends of the holding section and are mounted on the mounting section of the steering wheel body;

the holding section of the mounting bracket includes:
 a pair of holding walls that are opposed to each other, each of the holding walls including a holding recess which receives and holds the projected section of the motor body on which the assembling plate sections of the clip are mounted; and
 a connecting wall that connects the holding walls together;

each of the holding recesses of the holding walls includes:
 an insertion opening for receiving the projected section of the motor body, the insertion opening being formed along a direction that the edges of the circuit substrate press the holding stops of the clip; and
 a fit-in region that holds the projected section of the motor body in a fitted fashion, the fit-in region being so formed as to bend at an end of the insertion opening in a direction perpendicular to a direction that the holding stop presses the circuit substrate; and the holding stops and the retaining pawls of the clip are located distant from each other in a direction that the terminal of the circuit substrate is inserted into the terminal hole such that the retaining pawls of the clip are engaged with and hold the retained regions located on the holding walls of the mounting bracket and the holding stops press the edges of the circuit substrate connected to the mounting base of the motor body in a state that the projected sections of the motor body are fitted in the fit-in regions of the holding recesses of the holding walls of the mounting bracket.

With the configuration described above, the clip is assembled with the motor body in such a manner that the holding stops press the edges of the circuit substrate against the motor body if the projected sections formed on the opposite end planes of the motor body to which the circuit substrate is connected are inserted into the assembling recesses of the assembling plate sections of the clip. Then if the projected sections are inserted into the insertion openings of the holding recesses of the holding walls and then set in the fit-in regions, the vibration motor, the clip and the mounting bracket are so assembled that the retaining pawls are engaged with and hold the retained regions of the mounting bracket and the holding stops press the edges of the circuit substrate connected to the mounting base of the motor body.

That is, the holding stops and the retaining pawls prevent the circuit substrate from being disengaged from the motor body while the clip is assembled with the mounting bracket. At the same time, with the projected sections fitted in the fit-in regions of the holding walls, the vibration motor is also smoothly assembled with and supported by the mounting bracket.

It is further desired that:

each of the insertion openings of the holding recesses of the holding walls of the mounting bracket is located on an edge of the holding wall and each of the fit-in regions is so formed as to bend toward the connecting wall from the insertion opening;

the connecting wall abuts against an outer circumference of the motor body in a state that the projected regions of the motor body are set in the fit-in regions of the holding recesses; and the clip further includes a spacer that extends from one of the assembling plate sections and is pressed onto a region of the outer circumference of the motor body facing away from the connecting wall of the mounting bracket and onto the mounting section of the steering wheel body in a state that the mounting tongues of the mounting bracket are secured to the mounting section of the steering wheel body.

With this configuration, if the projected sections on the end planes of the motor body on which the clip is mounted are set in the fit-in regions, via the insertion openings, of the holding recesses, the connecting wall of the mounting bracket abuts against and hold the outer circumference of the motor body. Then if the mounting tongues of the mounting bracket are secured to the mounting section of the steering wheel body, the motor body supported by the connecting wall is brought into contact with the mounting section of the steering wheel body with the spacer disposed therebetween in an elastically deformed state. That is, the spacer, which is elastically deformable, will fill any gaps due to a dimension error between the outer circumference of the motor body and the mounting section of the steering wheel body, and help transmit vibration of the motor body to the mounting section.

Furthermore, it is desired that the spacer includes a housing hole that houses a circular-arc planar region of the outer circumference of the motor body located between the end planes, and that opposing edges of the housing hole serve as supporting edges that abut against regions in the circular-arc planar region of the outer circumference of the motor body which are disposed on both sides of a most projected region of the circular-arc planar region in a cross-sectional surface of the motor body taken in a direction perpendicular to the rotational axis.

With this configuration, when mounting the clip on the motor body, if the circular-arc planar region of the outer circumference of the motor body is set in the housing hole of the spacer, the supporting edges of the housing hole abut against the regions in the circular-arc planar region which are disposed on both sides of the most projected region of the circular-arc planar region, and prevent the clip from being disengaged from the motor body in a direction perpendicular to the axial center of the rotational axis. That is, the clip is assembled with the motor body in a secure fashion with the holding stops brought into contact with the edges of the circuit substrate and with the supporting edges abutting against and holding the regions in the circular-arc planar region located on both sides of the most projected region. Accordingly, in a subsequent process of assembling the motor body and the mounting bracket, there will be no need to hold the clip, thereby facilitating the assembling of the vibration device.

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
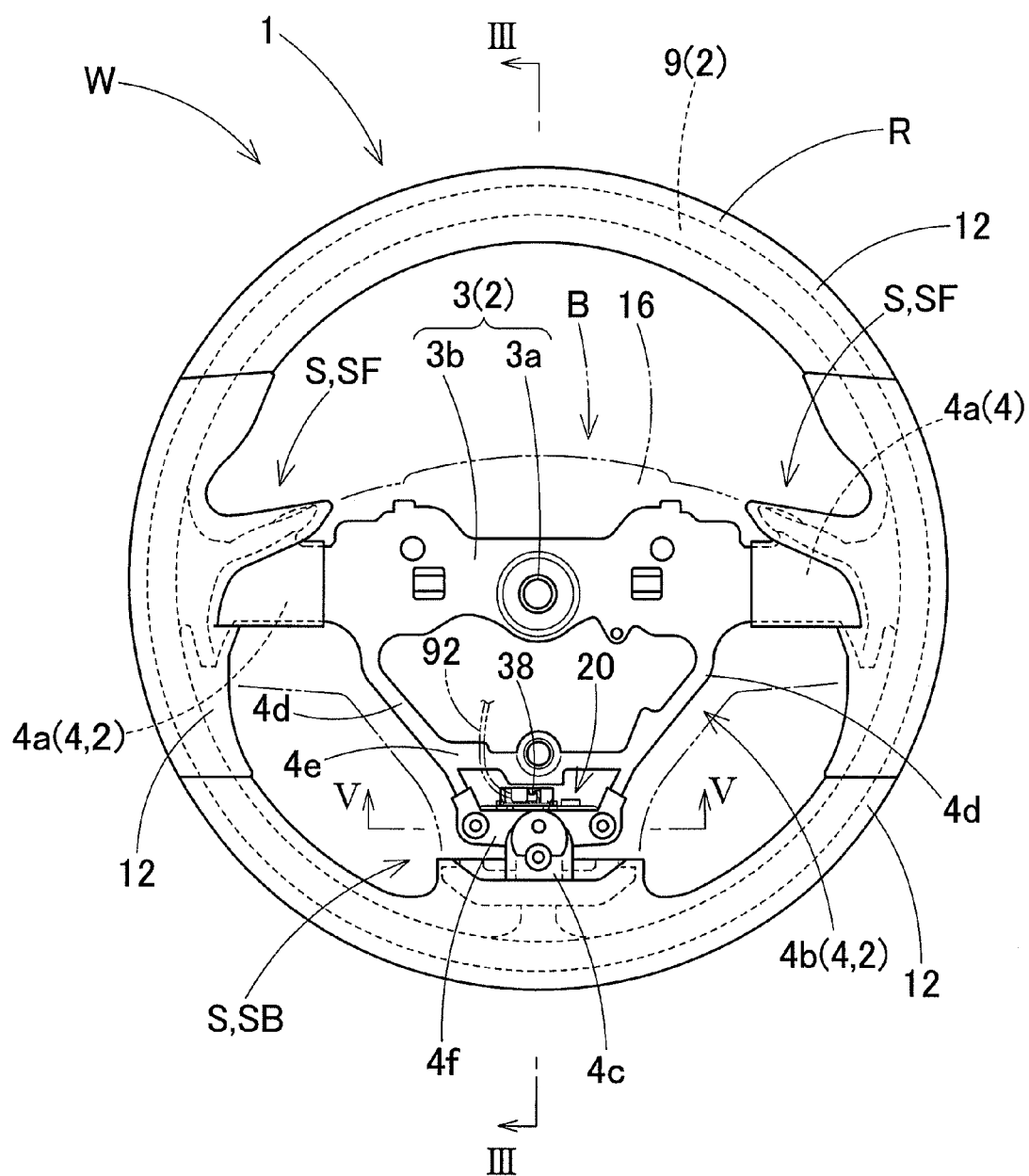
FIG. 1 is a schematic plan view of a steering wheel embodying the invention.
Figure 2:
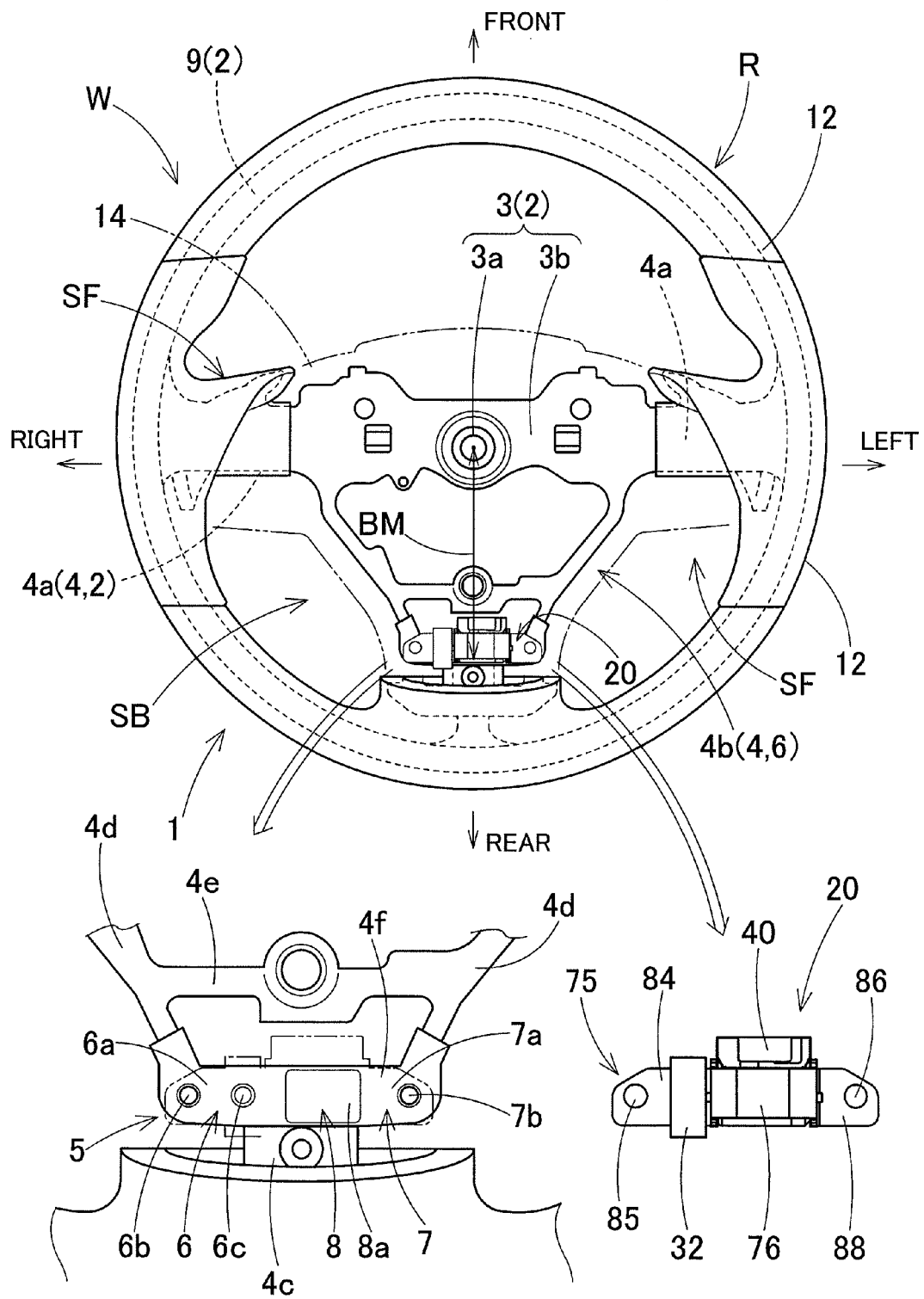
FIG. 2 is a schematic bottom view of the steering wheel of FIG. 1 showing schematic enlarged views of a vibration device as well as a mounting section of the vibration device.
Figure 3:
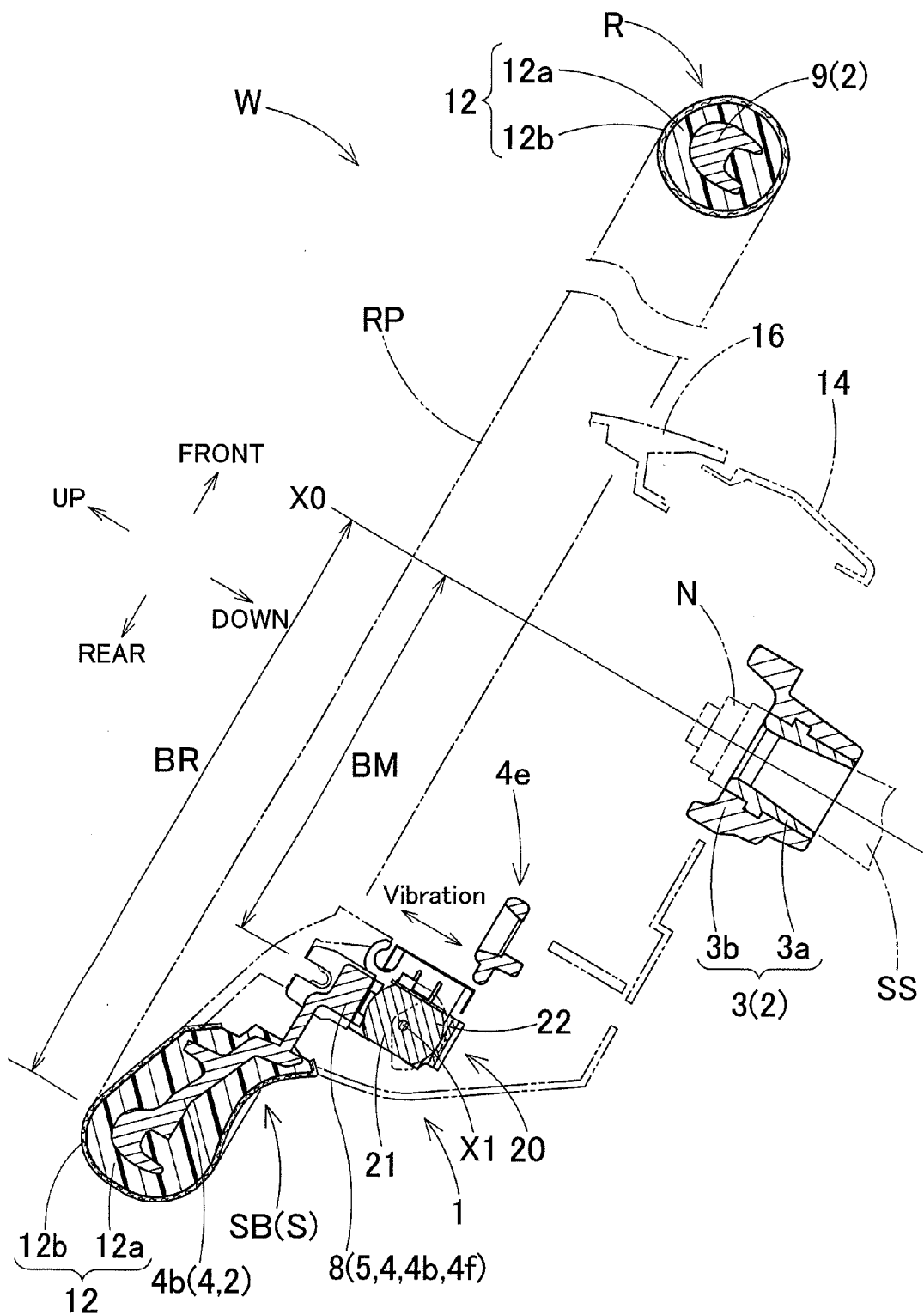
FIG. 3 is a schematic vertical section of the steering wheel of FIG. 1 taken along line III-III of FIG. 1.

As shown in FIGS. 1 to 3, a steering wheel W embodying the invention includes a vibration device 20 and a wheel body 1. The wheel body 1 includes a generally annular ring section R, a boss section B and a plurality of (three, in the illustrated embodiment) spokes S. The ring section R is for holding at steering operation. The boss section B is disposed at the center of the ring section R and is secured to a steering shaft SS. The spokes S interconnect the boss section B and the ring section R. The steering wheel body 1 includes a core 2 which has such a contour that the ring section R, boss section B and spokes S are interconnected. The core 2 includes a boss core section 3 located at the boss section S, a spoke core section 4 located at the spokes S and a ring core section 9 located at the ring section R.

A boss 3a of the boss core section 3 is made from steel, and other sections, i.e., a boss plate section 3b of the boss core section 3, which is arranged around the boss 3a, the spoke core section 4, and the ring core section 9 are die cast from such light alloy metal as aluminum alloy. The boss 3a of the boss core section 3 is connected to a steering shaft SS which is inserted through the boss 3a and nut N fixed thereto.

The spoke core section 4 includes front sections 4a and 4b which are located at front left and right spokes SF and extend toward left and right from the boss plate section 3b, and a rear section 4b located at a rear spoke SB. The rear section 4b includes a main body 4c which extends forward from a rear end region of the ring core section 9, bifurcate sections 4d which bifurcate toward left and right in a vicinity of the front end of the main body 4c and are connected to left and right end regions of the boss plate section 3b and transverse bars 4e and 4f which connect the bifurcate sections 4d together at a vicinity of the main body 4c and are arranged one behind the other.

The wheel body 1 is covered with a cladding layer 12 at the ring core section 9 and a region of the spoke core section 4 adjoining the ring core section 9. The cladding layer 12 is composed of a resin region 12a of urethane or the like and a leather 12b mounted on an outer circumference of the resin region 12a.

Underneath the boss section B is a lower cover 14 made from synthetic resin. On top of the boss section B is a pad 16 provided with an unillustrated airbag device.

Figure 4A:
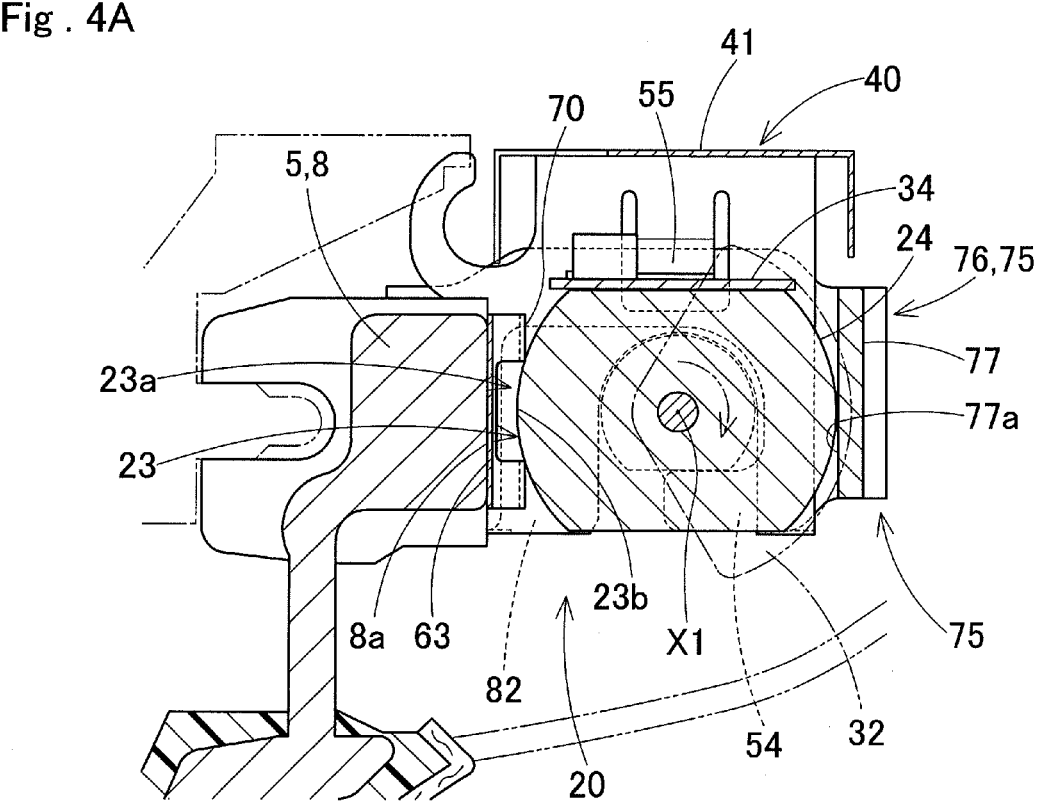
FIG. 4A is an enlarged vertical section of a vicinity of the vibration device in the steering wheel of FIG. 1.

As shown in FIGS. 3 to 5, at the rear spoke SB, a mounting section 5 is provided on an underside of the rear transverse bar 4f of the spoke core section 4. The vibration device 20 is mounted on the mounting section 5. The mounting section 5 is located at the rear of the boss 3a as the steering wheel W is steered straight ahead and in a vicinity of a center in a left and right direction of the ring section R. The mounting section 5 includes at the center a vibration receiving base 8 which is a generally rectangular parallelepiped in shape and protrudes downwardly, and on left and right sides of the vibration receiving base 8 are mounting bases 6 and 7. Each of the mounting bases 6 and 7 includes a mounting hole 6b/7b, which is a screw hole, extending along an axial center XO of the steering shaft SS and of the boss 3a. The mounting base 6 further includes a projection 6c which protrudes downwardly in a columnar shape.

Base planes or undersides 6a, 7a and 8a of the mounting bases 6 and 7 and of the vibration receiving base 8 are perpendicular to the axial center XO of the boss 3a and parallel to a ring forming plane RP of the ring section R.

Referring to FIGS. 4 to 13, the vibration device 20 includes a vibration motor 21 which is provided with a weight 32 and a mounting bracket 75. The vibration device 20 of this specific embodiment further includes a clip 40 which is provided with a spacer 60 located between the vibration motor 21 and the vibration receiving base 8, and a circuit substrate 34 which includes a connector 38 to which a lead wire 92 (FIGS. 1, 6 and 7) is connected for feeding the vibration motor 21 with an electric power (DC12V).

The vibration motor 21 includes a motor body 22 and a rotational axis 30 which protrudes out of a first end plane 22b of the motor body 22. With regions on an outer circumference 22a which oppose each other in a direction orthogonal to the axial center X1 of the rotational axis 30 cut out in a planar fashion, the motor body 22 is formed into a generally column having an oval sectional shape. That is, the outer circumference 22a of the motor body 22 includes two circular-arc planar regions 23 and 24 and two flat regions 25 and 26. The circular-arc planar region 23 serves as an approximate region 23 which approximates to the vibration receiving base 8 and the other circular-arc planar region 24 serves as a distant region 24 which faces away from the vibration receiving base 8.

Figure 7:
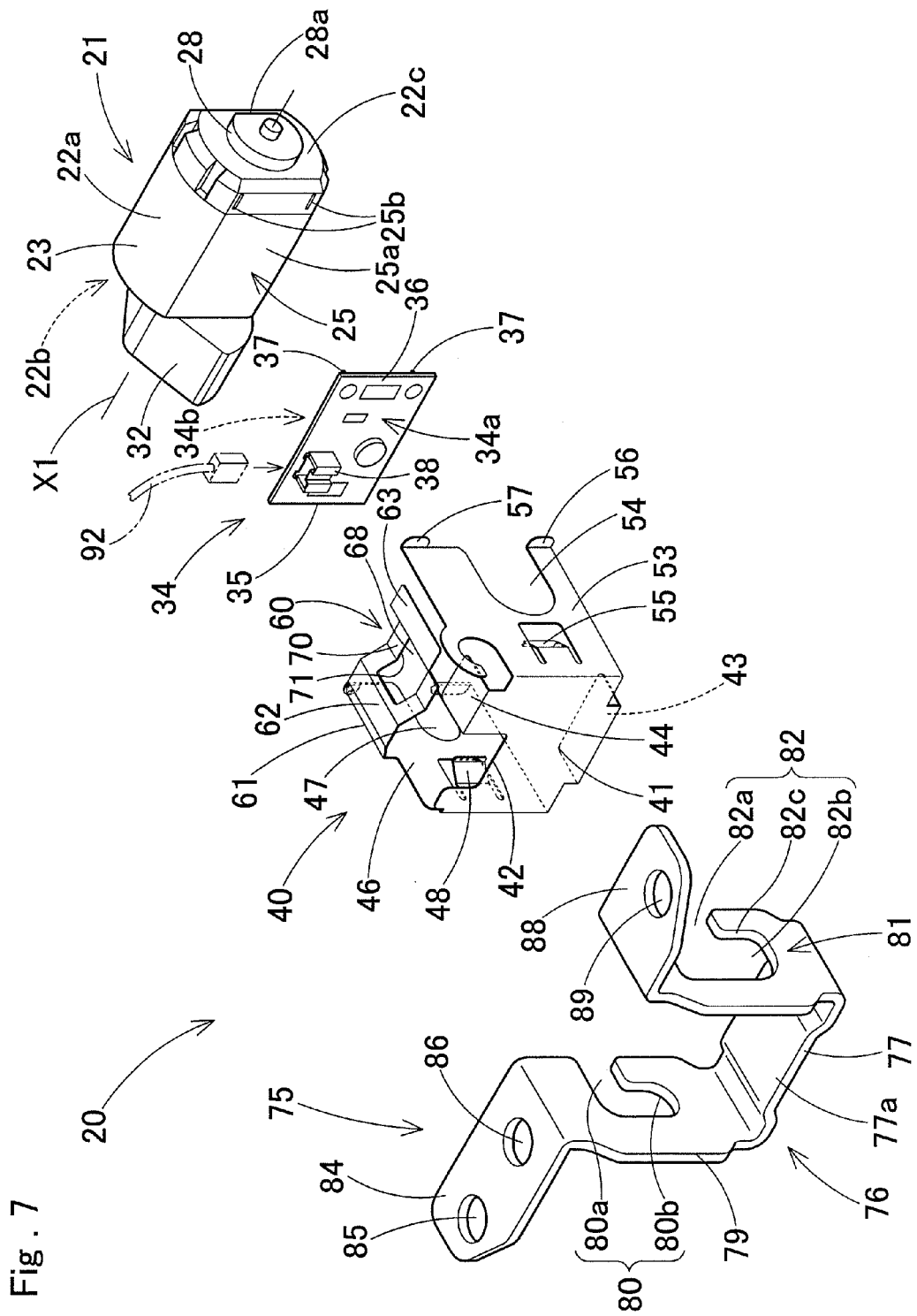
FIG. 7 is an exploded perspective view of the vibration device as viewed from the back side of the vibration device (i.e., as viewed from the front in a front and rear direction)

As shown in FIG. 7, the flat region 25 of the outer circumference 22a serves as a mounting base 25 on which the circuit substrate 34 is mounted, and includes at a peripheral region close to a second end plane 22c of the motor body 22 two terminal holes 25b in which terminals 37 of the circuit substrate 34 are plugged for feeding DC voltage. A base plane 25a of the mounting base 25 is a flat plane. When the circuit substrate 34 is assembled with the mounting base 25 with the terminals 37 plugged in the terminal holes 25b, a back face 34b of the circuit substrate 34 abuts against the base plane 25a generally entirely.

The circuit substrate 34 further includes on the surface 34a a connector 38 to which the lead wire 92 (FIGS. 1, 6 and 7) is connected for feeding the vibration motor 21 with an electric power (DC12V) and an electronic circuit (reference numeral omitted) provided with an IC chip for removing electric noises.

The motor body 22 further includes on both of the end planes 22b and 22c pivotally-support sections (projected sections) 27 and 28 projecting outwardly, and the rotational axis 30 protrudes longer out of the pivotally-support section 27 than from the pivotally-support section 28. The pivotally-support section 28 on the end plane 22c facing away from the weight 32 has a greater outer diameter than the pivotally-support section 27 and is formed into an odd-shaped column, not into a circular column, with a flat region 28a at a rear outer circumference, unlike the pivotally-support section 27 which has a circular columnar shape.

The weight 32 attached to the rotational axis 30 is formed into a generally ⅓ circular plate with a certain thickness and includes at an eccentric position an engagement hole 32 engageable with the rotational axis 30.

As shown in FIGS. 4A to 13, 18 and 19, the mounting bracket 75 is made of sheet metal and includes a holding section (or pressing section) 76 which holds the vibration motor 21 in such a manner as to press the motor 21 toward the vibration receiving base 8 of the mounting section 5 of the core 2, and a pair of mounting tongues 84 and 88 which extend from left and right ends of the holding section 76 and are mounted on the mounting bases 6 and 7 of the mounting section 5, respectively.

The mounting tongue 84 corresponds to the mounting base 6, and includes a mounting hole 85 for receiving a screw (or fixing means) 11 which is fastened into the mounting hole 6b of the mounting base 6 when fixing the mounting tongue 84 to the mounting base 6. The mounting tongue 84 further includes a fit-in hole 86 for receiving the projection 6c. The mounting tongue 88 corresponds to the mounting base 7 and includes a mounting hole 89 for receiving a screw 11 which is fastened into the mounting hole 7b of the mounting base 7 when fixing the mounting tongue 88 to the mounting base 7.

The holding section 76 has a curved shape with a U-shaped sectional shape and includes holding walls (mounting walls) 79 and 81 which are opposed to each other in a left and right direction extending along an axial center X1 of the rotational axis 30 of the vibration motor 21 and a connecting wall (pressing wall) 77 which connects the holding walls 79 and 81 together. The connecting wall 77 includes a pressing plane 77a which is formed into a generally rectangle and abuts against the distant region 24 of the outer circumference 22a of the motor body 22 which is located away from the vibration receiving base 8. The pressing plane 77a is so configured as to be raised from left and right edges of the holding walls 79 and 81.

The holding wall 79 is located on the side of the end plane 22b of the motor body 22 and includes a holding recess (assembling recess) 80 for receiving the pivotally-support section 27 provided with the weight 32. The holding recess 80 includes an insertion opening 80a which extends forward from the rear edge of the holding wall 79 and a fit-in region 80b which bends downwardly at the front end of the insertion opening 80a in a perpendicular fashion. A lower end of the fit-in region 80b is formed into a semicircular shape and the fit-in region 80b is so shaped and sized that the pivotally-support section 27 fits in the lower end.

The holding wall 81 is located on the side of the end plane 22c of the motor body 22 and includes a holding recess (assembling recess) 82 for receiving the odd-shaped pivotally-support section 28. The assembling recess 82 includes an insertion opening 82a which extends forward from the rear edge of the holding wall 81 and a fit-in region 82b which bends downwardly at the front end of the insertion opening 82a and is provided with a planar region 82c slidable with the flat region 28a of the pivotally-support section 28. A lower end of the fit-in region 82b is formed into such a generally semicircular shape as to correspond to an outer contour of a lower region of the pivotally-support section 28 with the flat region 28a, and the fit-in region 82b is so shaped and sized that the pivotally-support section 28 fits in the lower end.

The holding recesses 80 and 82 are so designed that the distant region 24 of the motor body 22 abuts against the pressing plane 77a of the connecting wall 77 in the holding section 76 when the pivotally-support sections 27 and 28 of the motor body 22 are set in the corresponding fit-in regions 80b and 82b.

As shown in FIGS. 4A to 17, the clip 40 is punched out in a predetermined shape out of a thin flat spring material with a thickness t (FIG. 11) of about 0.2 mm and shaped by bending work. The clip 40 includes a pair of assembling plate sections (assembling sections) 46 and 53 which are opposed to each other along an axial center X1 of the rotational axis 30 of the vibration motor 21 and a connection plate section (connection wall) 41 which connects the assembling plate sections 46 and 53 together, thus has a generally U-shaped sectional shape. Further, a spacer 60 extending from an upper edge 51 of the assembling plate section 46 in a curving fashion and having a generally rectangular plate shape is integrated into the clip 40. The clip 40 holds the circuit substrate 34, which is assembled with the vibration motor 21 with the terminals 37 plugged in the terminal holes 25b, against the vibration motor 21 as well as functions as the spacer 60 which absorbs any assembling error between the vibration motor 21 and vibration receiving base 8 in order to transmit vibration of the motor body 22 to the vibration receiving base 8 smoothly.

The connection plate section 41 is so arranged as to cover the circuit substrate 34 assembled with the vibration motor 21 and includes extended regions 43 and 44 which extend rearward from upper and lower edges of the connection plate section 41 for protecting various IC chips of the circuit substrate 34. At an upper periphery of the connection plate section 41 is a recess 42 for receiving the connector 38 of the circuit substrate 34 for facilitating the connecting of the lead wire 92 to the connector 38.

The assembling plate section 46 is located on the side of the end plane 22b of the motor body 22 and includes an assembling recess 47 engageable with the pivotally-support section 27 provided with the weight 32. The assembling recess 47 extends forward from the rear edge of the assembling plate section 46 in a shape of an elongated hole and is shaped into a semicircle at the front end. The assembling recess 47 is so shaped and sized that the pivotally-support section 27 fits in the front end. The assembling plate section 46 further includes at its peripheral region on the side of the connection plate section 41 a holding stop 48 which is cut and raised inward and extends rearward in a generally rectangular plate shape. The holding stop 48 pushes a right edge 35 of the circuit substrate 34 toward the mounting base 25 and prevents the circuit substrate 34 from being disengaged from the vibration motor 21. The holding stop 48 includes a main body 48a which is located at a root region and a contact region 48b which is bent from the main body 48a and extends flatly along the surface 34a of the circuit substrate 34 so as to push the surface 34a.

Figure 22A:
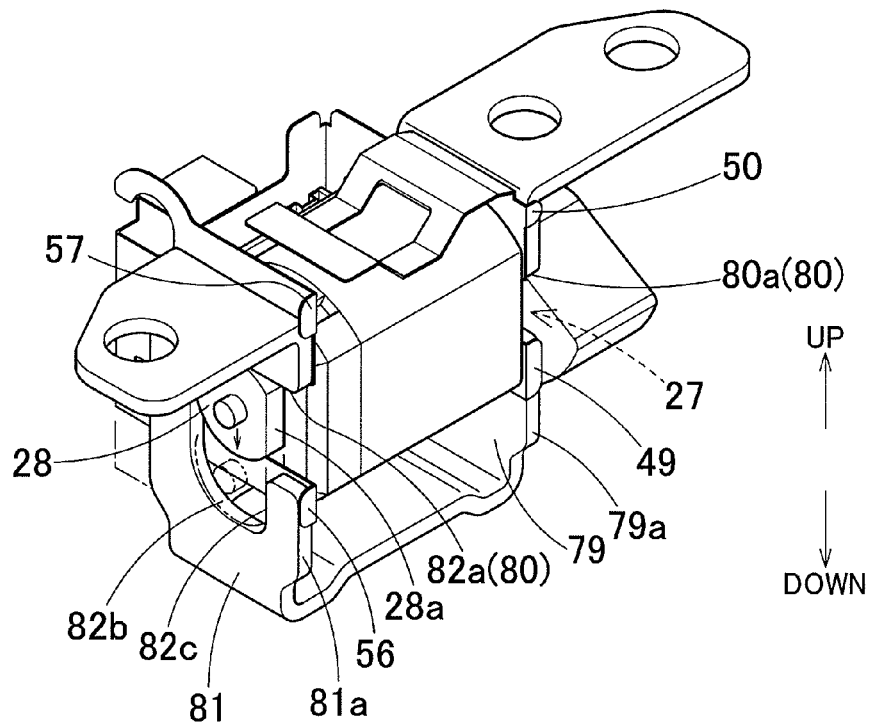
FIGS. 22A and 22B illustrate in order the way the mounting bracket is mounted on the vibration motor assembled with the circuit substrate and clip.

The assembling plate section 46 further includes at upper and lower regions of the rear edge retaining pawls 49 and 50 which bend outwardly for engagement with a rear end face (retained region) 79a of the holding wall 79 of the mounting bracket 75 (FIG. 22).

The assembling plate section 53 is located on the side of the end plane 22c of the motor body 22 and includes an assembling recess 54 engageable with the pivotally-support section 28. The assembling recess 54 extends forward from the rear edge of the assembling plate section 53 in a shape of an elongated hole and is shaped into a semicircle at the front end. The assembling recess 54 is so shaped and sized as to receive a columnar region of the pivotally-support section 28 facing away from the flat region 28a in a fitted fashion by the front end. The assembling plate section 53 further includes at its peripheral region on the side of the connection plate section 41 a holding stop 55 which is cut and raised inward and extends rearward in a generally rectangular plate shape. In a similar fashion to the holding stop 48, the holding stop 55 pushes a left edge 36 of the circuit substrate 34 toward the mounting base 25 and prevents the circuit substrate 34 from being disengaged from the vibration motor 21. The holding stop 55 also includes a main body 55a which is located at a root region and a contact region 55b which is bent from the main body 55a and extends flatly along the surface 34a of the circuit substrate 34 so as to push the surface 34a.

The assembling plate section 53 further includes at upper and lower region of the rear edge retaining pawls 56 and 57 which bend outwardly for engagement with a rear end face 81a of the holding wall 81 of the mounting bracket 75 (FIG. 22).

The contact regions 48b and 55b of the holding stops 48 and 55 of the clip 40 are so arranged as to oppose a forming direction of the assembling recesses 47 and 54 of the assembling plate sections 46 and 53, i.e., a direction heading from the rear to front, and the retaining pawls 49, 50, 56 and 57 are formed at such positions as to be engageable with the rear end faces 79a and 81a of the mounting bracket 75 when the clip 40 is assembled with the mounting bracket 75. That is, the holding stops 48 and 55 are distant from the retaining pawls 49, 50, 56 and 57 in the forming direction of the assembling recesses 47 and 54 or in an inserting direction of the terminals 37 of the circuit substrate 34 into the terminal holes 25b, i.e., in a front and rear direction. In other words, the contact regions 48b and 55b of the holding stops 48 and 55 oppose the retaining pawls 49, 50, 56 and 57 in a front and rear direction.

Further, the assembling plate section 53 includes at the upper edge a hook 58 for retaining the lead wire 92.

The spacer 60 extends in a left and right direction toward the assembling plate section 53 through the medium of a joint region 61 which extends upward from a rear region of the upper edge 51 of the assembling plate section 46 and bends toward the left, thus having a L-shaped sectional shape. The spacer 60 includes core-side contact regions 62 and 63, a motor-side contact region 70, legs 65 and 66 and a rectangular housing hole 68 formed over the motor-side contact region 70 and the legs 65 and 66.

The core-side contact regions 62 and 63 are located at left and right regions of the spacer 60 and are formed into a flat plane, respectively, for abutment against the base plane 8a of the vibration receiving base 8. The legs 65 and 66 extend obliquely downwardly toward the motor body 22 from opposing edges of the core-side contact regions 62 and 63 in an approaching fashion to each other. The motor-side contact region 70 is so formed as to connect leading ends 65a and 66a of the legs 65 and 66 together into a flat plane generally parallel to the core-side contact regions 62 and 63.

The housing hole 68 penetrates the motor-side contact region 70 and legs 65 and 66 in an up and down direction and is formed into a rectangle in which short sides oppose each other in a left and right direction as viewed from above, so as to house part of a circular-arc planar outer circumference 23a of the approximate region 23 of the motor body 22. A center in a front and rear direction of the housing hole 68 is located immediately above the axial center X1 of the rotational axis 30. Opposite edges of the motor-side contact region 70 which oppose each other in a direction perpendicular to the axial center X1 of the rotational axis 30 in a periphery of the housing hole 68 serve as supporting edges 71 and 72 which abut against and hold the circular-arc planar outer circumference 23a of the approximate region 23 of the motor body 22 housed in the housing hole 68 along the axial center X1 of the rotational axis 30.

Figure 11A:
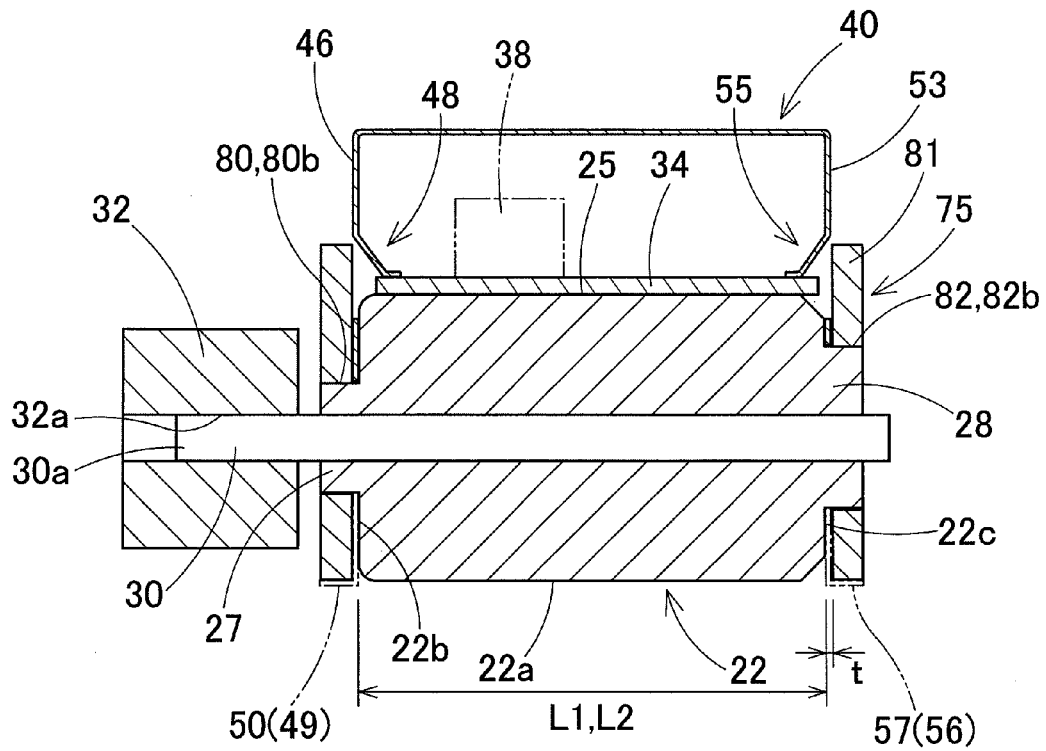
FIG. 11A is a schematic end view of the vibration device taken along line XI-XI in FIG. 10.
Figure 11B:
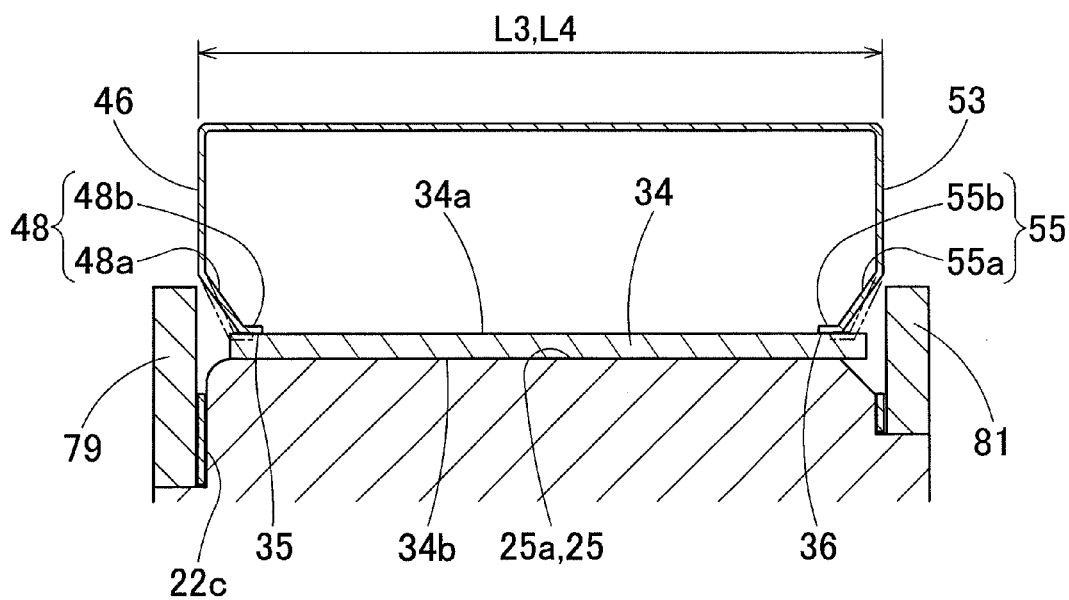
FIG. 11B illustrates the way the holding stops deform.
Figure 12:
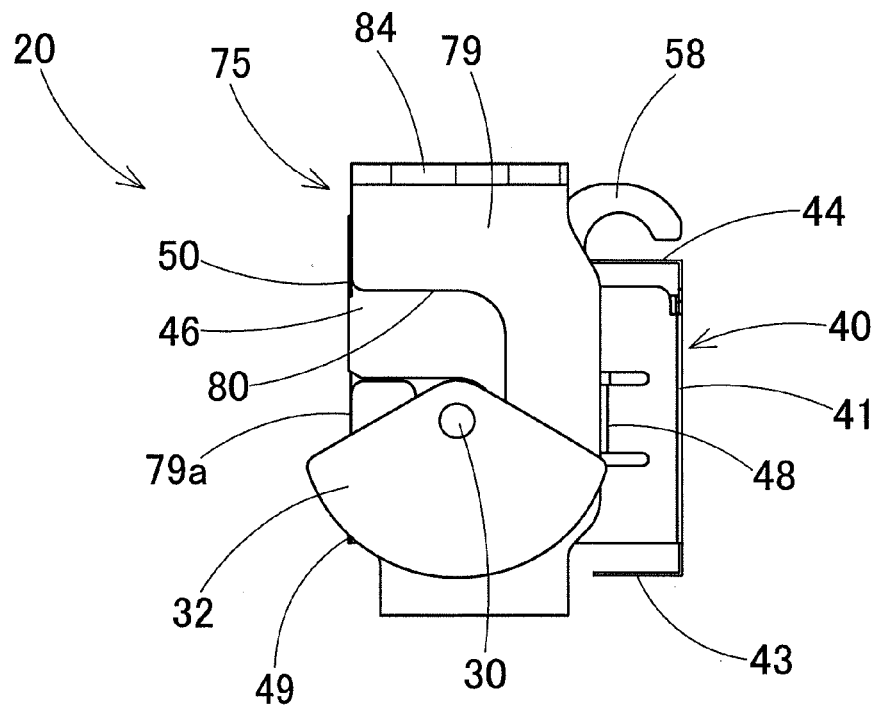
FIG. 12 is a right side view of the vibration device.
Figure 13:
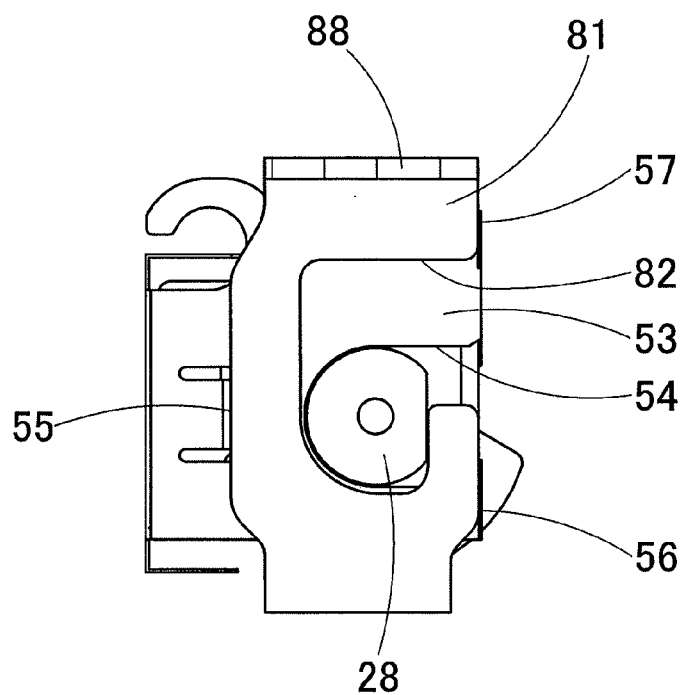
FIG. 13 is a left side view of the vibration device.
Figure 14:
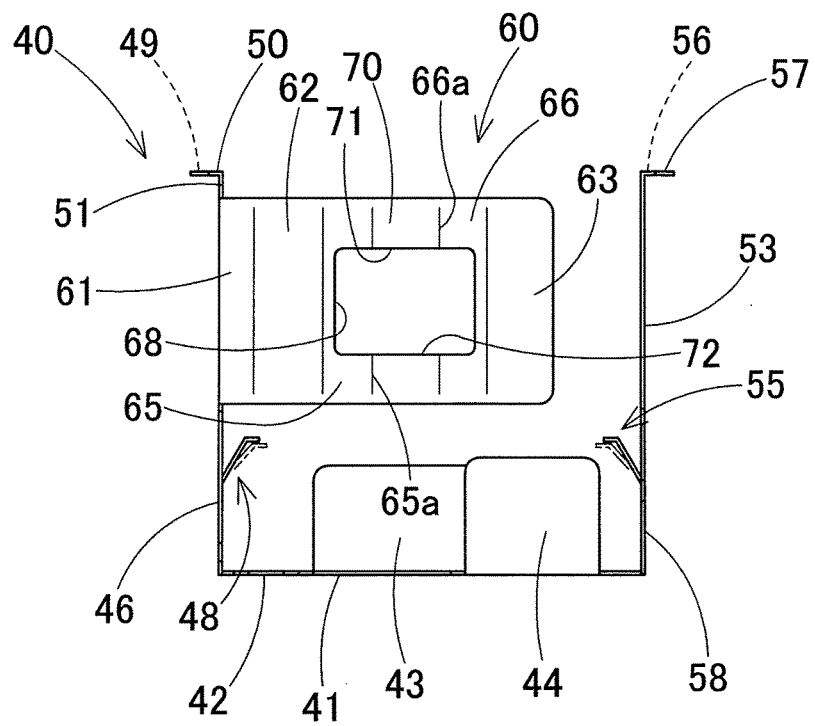
FIG. 14 is a plan view of a clip.

As shown in FIG. 11A, a length L2 of an inner region between the assembling plate sections 46 and 53 of the clip 40, i.e., a distance between the assembling plate sections 46 and 53, is generally equal to a length L1 between the end planes 22b and 22c of the motor body 22 of the vibration motor 21 such that the motor body 22 fits in between the assembling plate sections 46 and 53. As shown in FIG. 11B, a length L4 of an inner region between the holding walls 79 and 81 of the mounting bracket 75, i.e., a distance between the holding walls 79 and 81, is generally equal to a length L3 of an outer region between the assembling plate sections 46 and 53 of the clip 40 such that the assembling plate sections 46 and 53 of the clip 40 in which the motor body 22 is set fits in between the holding walls 79 and 81.

Figure 8:
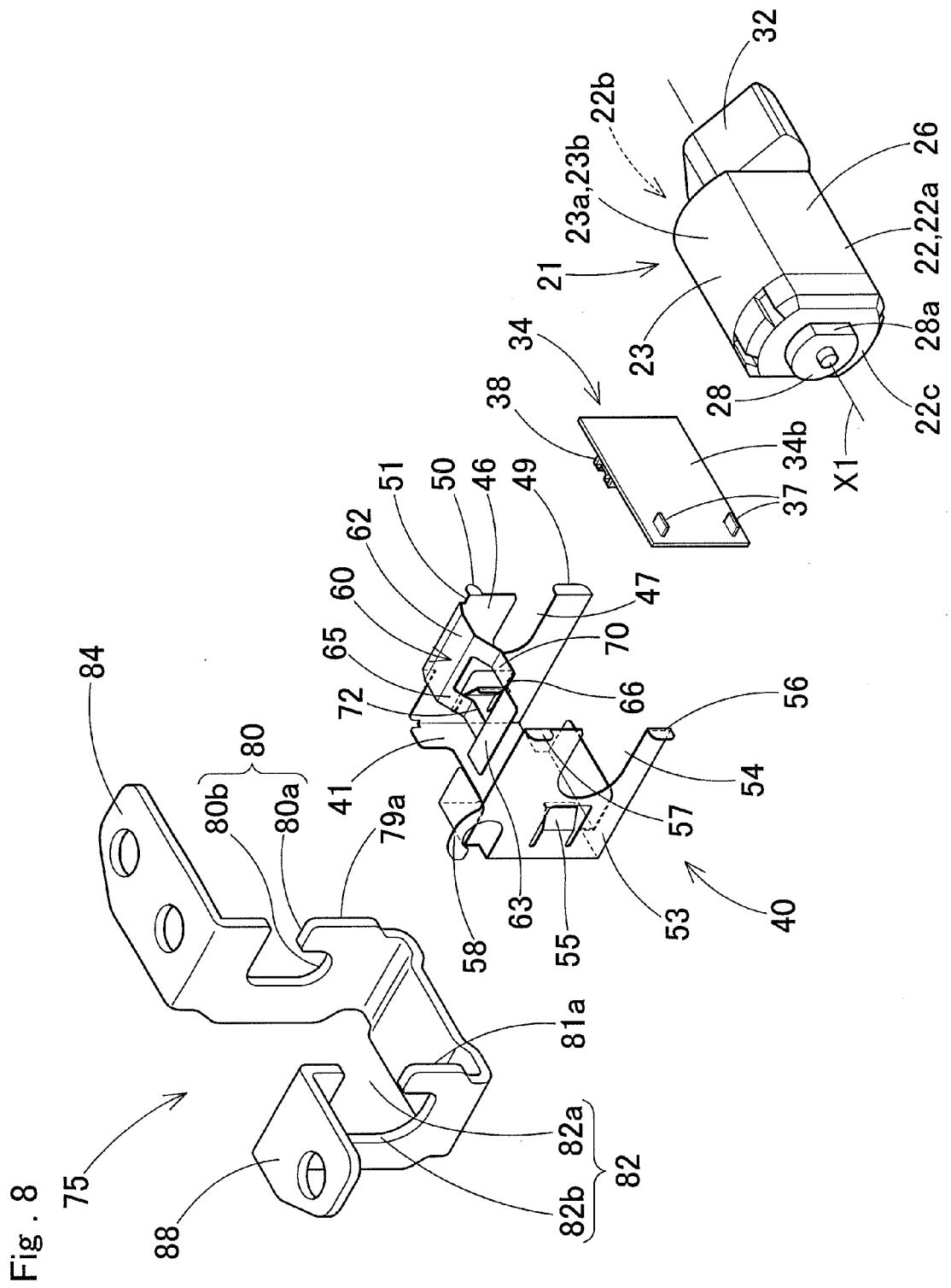
FIG. 8 is an exploded perspective view of the vibration device as viewed from the front of the vibration device (i.e., as viewed from the rear in a front and rear direction)
Figure 9:
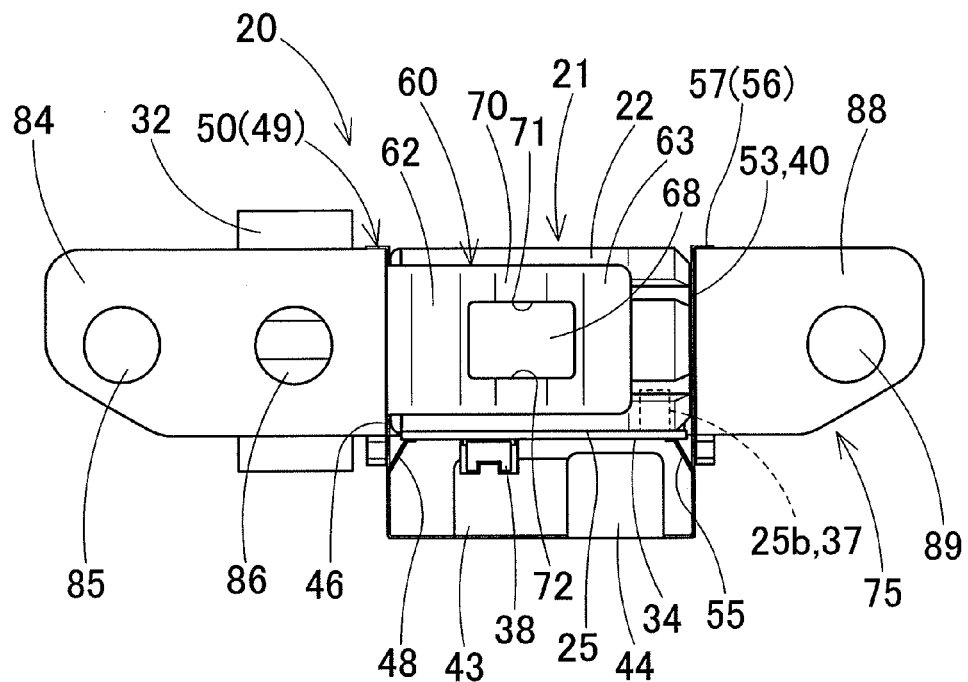
FIG. 9 is a plan view of the vibration device.
Figure 10:
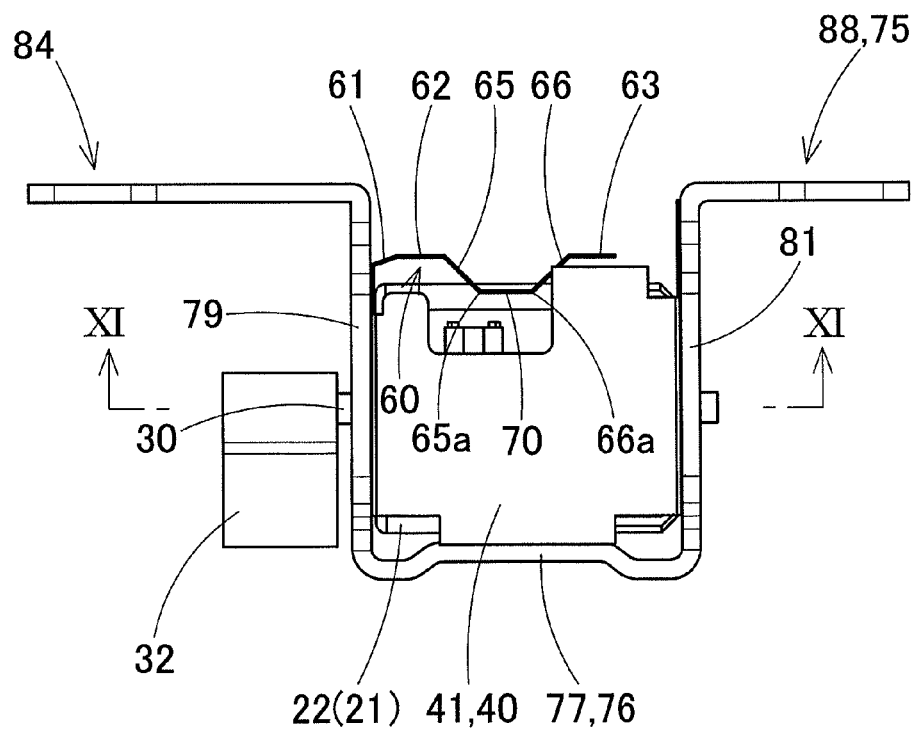
FIG. 10 is a front elevation of the vibration device.
Figure 20:
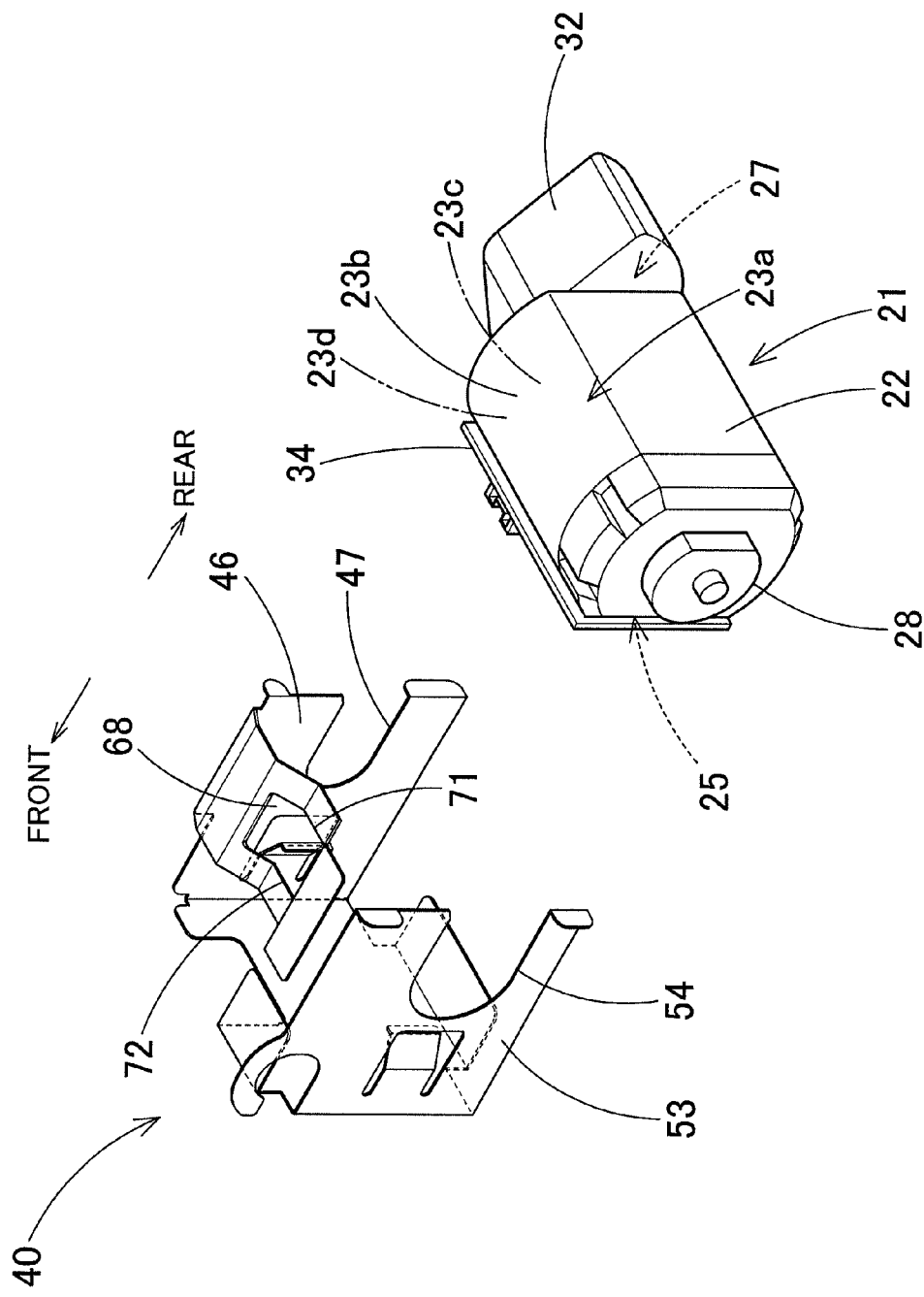
FIG. 20 is a perspective view of a vibration motor with which a circuit substrate is assembled.
Figure 21:
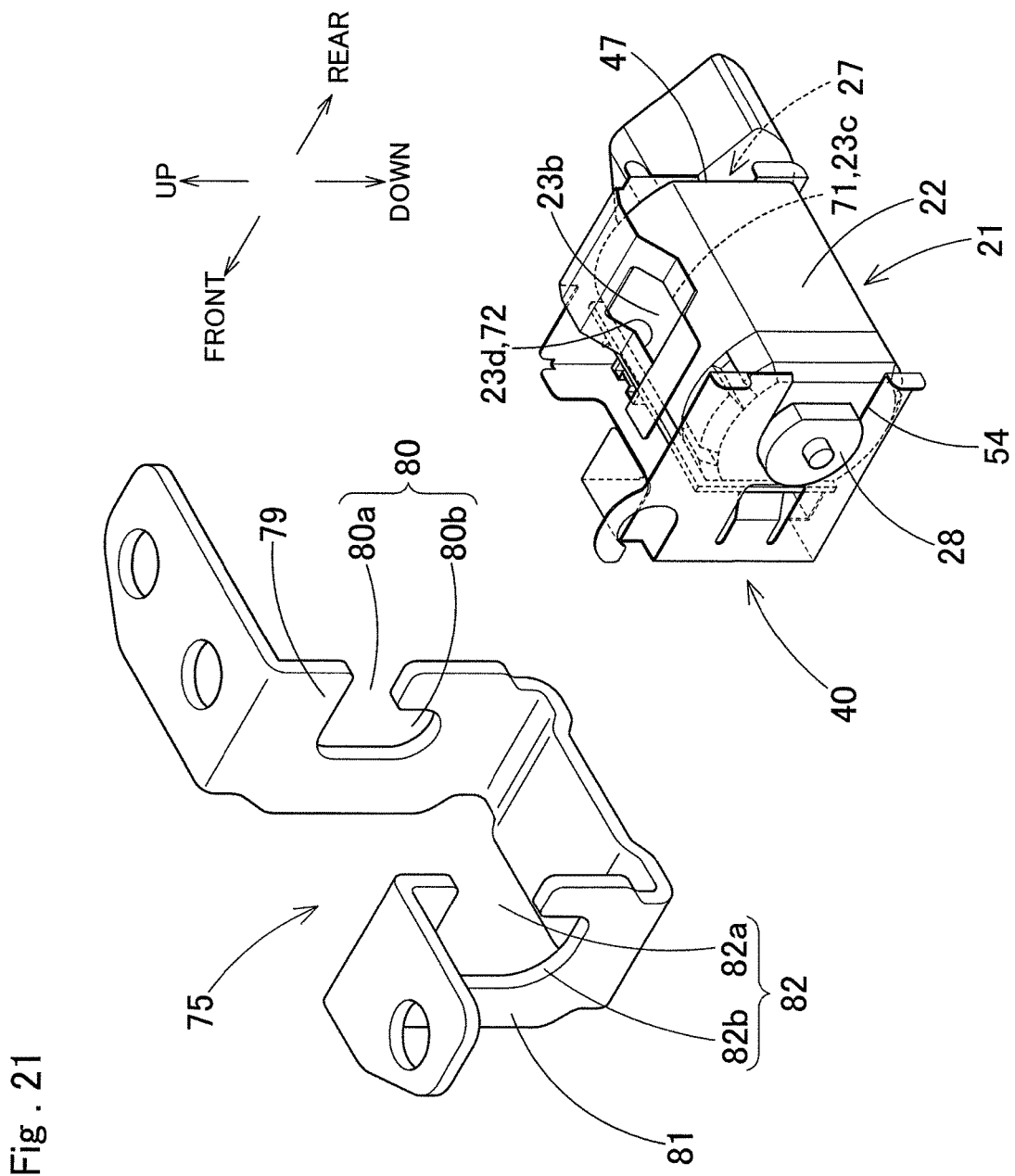
FIG. 21 is a perspective view of the vibration motor with which the circuit substrate and the clip are assembled.

The assembling process of the vibration device 20 is now described. Firstly, as shown in FIGS. 7, 8 and 20, the circuit substrate 34 is mounted on the mounting base 25 by inserting the terminals 37 into the terminal holes 25b and applying the back face 34b of the circuit substrate 34 on the base plane 25a of the mounting base 25.

Subsequently, as shown in FIGS. 7, 8, 20 and 21, the clip 40 is assembled with the vibration motor 21 on which the circuit substrate 34 is mounted. Firstly, the motor body 22 is so laid that the circuit substrate 34 faces toward the connection plate section 41 of the clip 40. If then the pivotally-support section 27 is pushed in up to the front end of the assembling recess 47 of the assembling plate section 46 and the pivotally-support section 28 is pushed in up to the front end of the assembling recess 54 of the assembling plate section 53 until the pivotally-support section 27 and 28 fit in the assembling recesses 47 and 48, respectively, the motor body 22 is assembled with the clip 40.

Figure 4B:
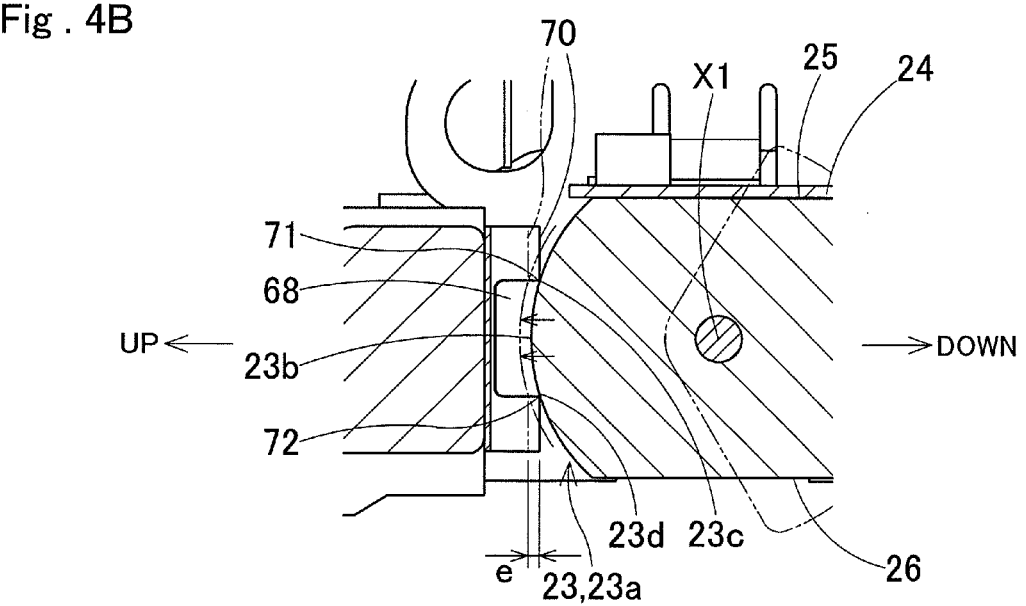
FIG. 4B illustrates a deforming amount of a spacer.
Figure 5A:
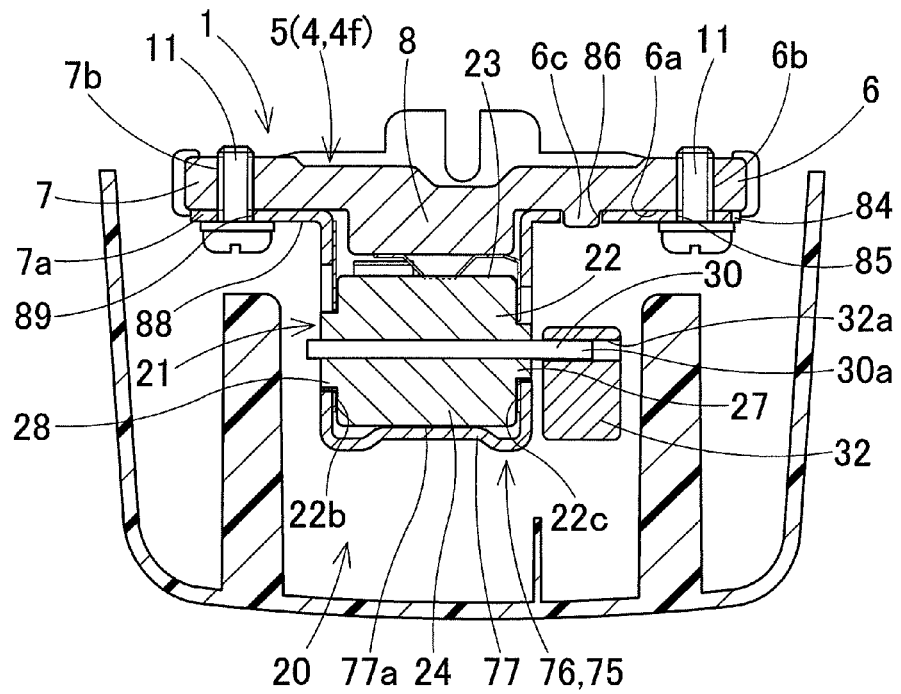
FIG. 5A is a schematic vertical section taken along line V-V of FIG. 1.

At this time, on the part of the spacer 60, the circular-arc planar outer circumference 23a of the approximate region 23 of the motor body 22 is housed in the housing hole 68, and the supporting edges 71 and 72 abut against and hold the circular-arc planar outer circumference 23a along the axial center X1, as shown in FIG. 4B. Regions 23c and 23d of the approximate region 23 supported by the supporting edges 71 and 72 are located on both sides of a projecting top (i.e., the most projected region) 23b of the circular-arc planar outer circumference 23a of the approximate region 23 of the motor body 22. Therefore, the spacer 60 is engaged with the approximate region 23 of the motor body 22 and is prevented from slipping in a front and rear direction (i.e., in a direction perpendicular to the axial center X1), with the supporting edges 71 and 72 retained by vicinities of the projecting top 23b of the motor body 22.

Figure 15:
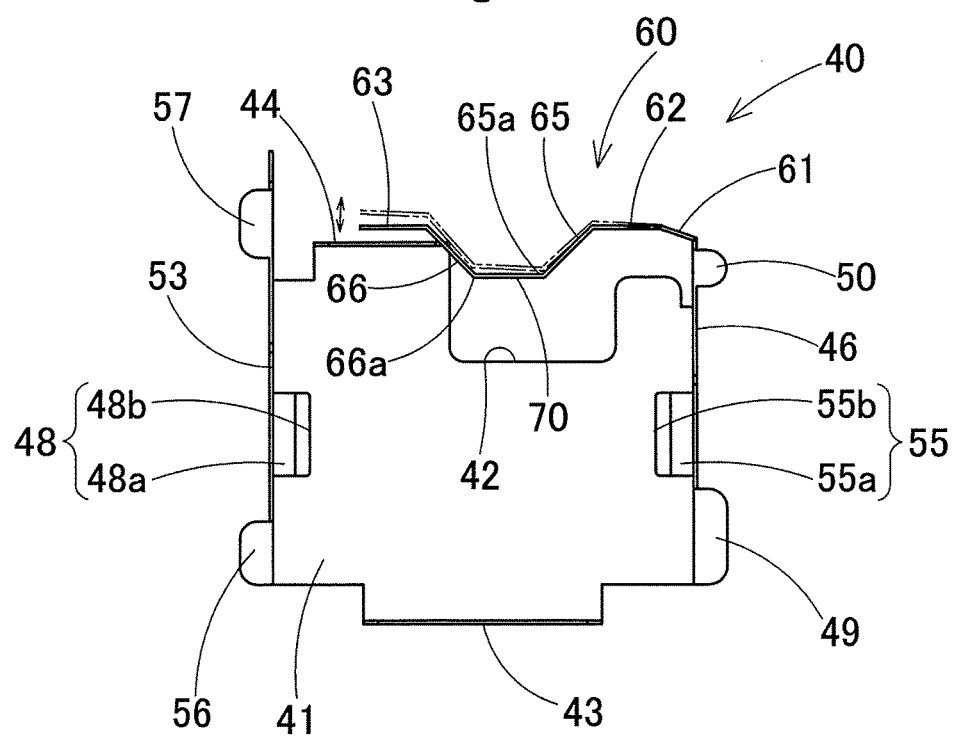
FIG. 15 is a rear view of the clip.
Figure 16:
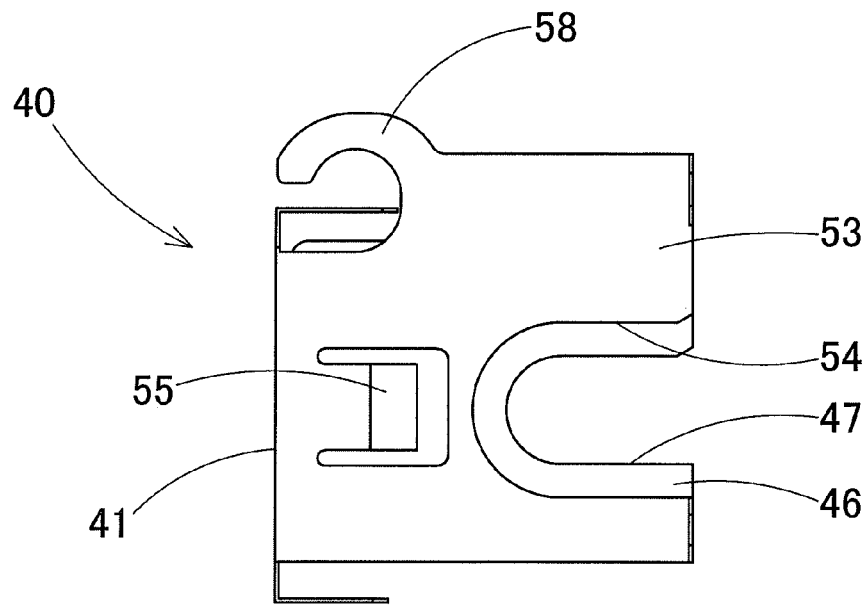
FIG. 16 is a left side view of the clip.
Figure 17:
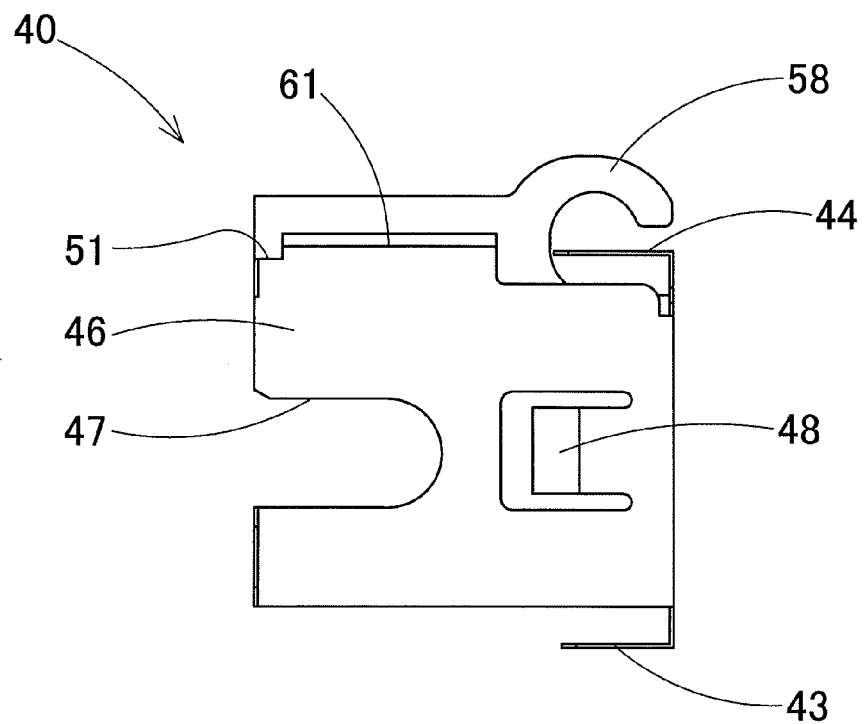
FIG. 17 is a right side view of the clip.
Figure 18:
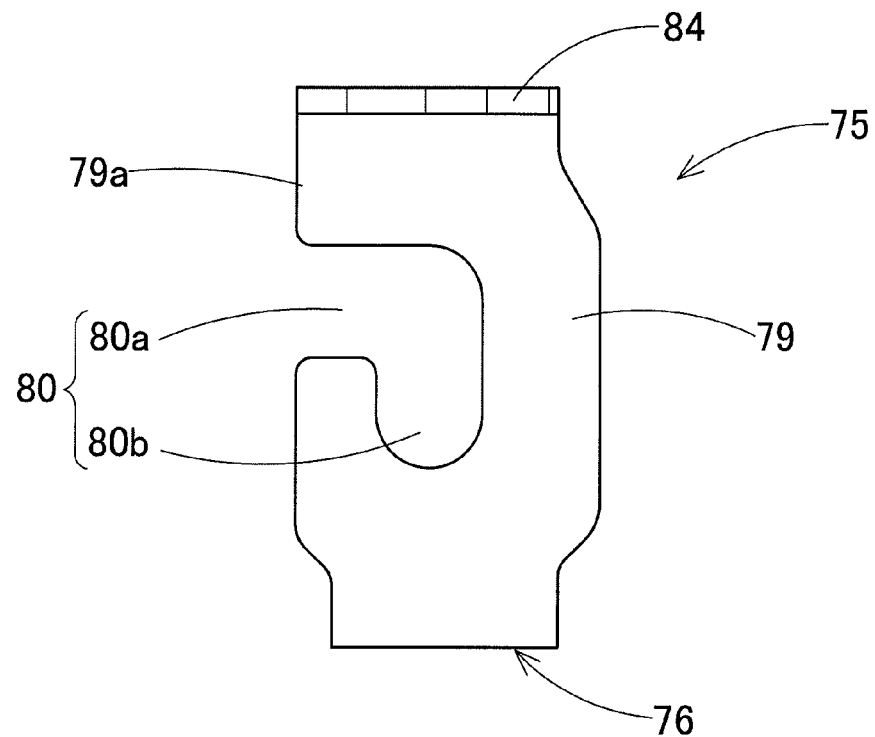
FIG. 18 is a right side view of a mounting bracket.
Figure 19:
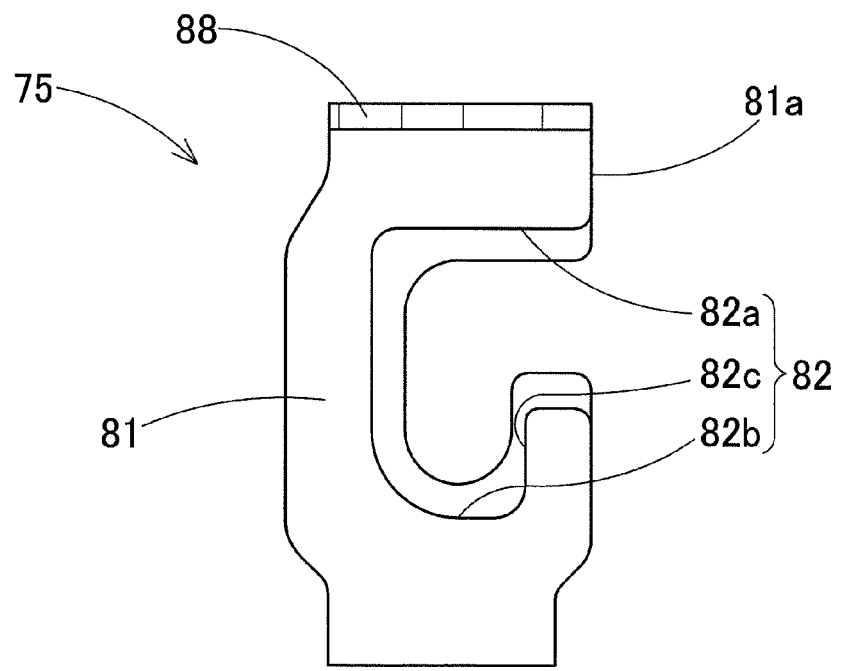
FIG. 19 is a left side view of the mounting bracket.

Housing of a region around the projecting top 23b of the motor body 22 in the housing hole 68 will be easy, since the spacer 60 is connected only to the assembling plate section 46 by only one core-side contact region 62 through the medium of the connecting region 61, and the connecting region 61 will bend and allow the core-side contact region 63, which is located away from the connecting region 61, to deform in such a manner as to move upward and then restore, as indicated by double-dotted lines in FIG. 15.

At this time, as shown in FIG. 11B, the contact regions 48b and 55b of the holding stops 48 and 55 of the assembling plate sections 46 and 53 press the right and left edges 35 and 36 of the surface 34a of the circuit substrate 34, thus prevent the circuit substrate 34 from coming off the motor body 22.

Figure 22B:
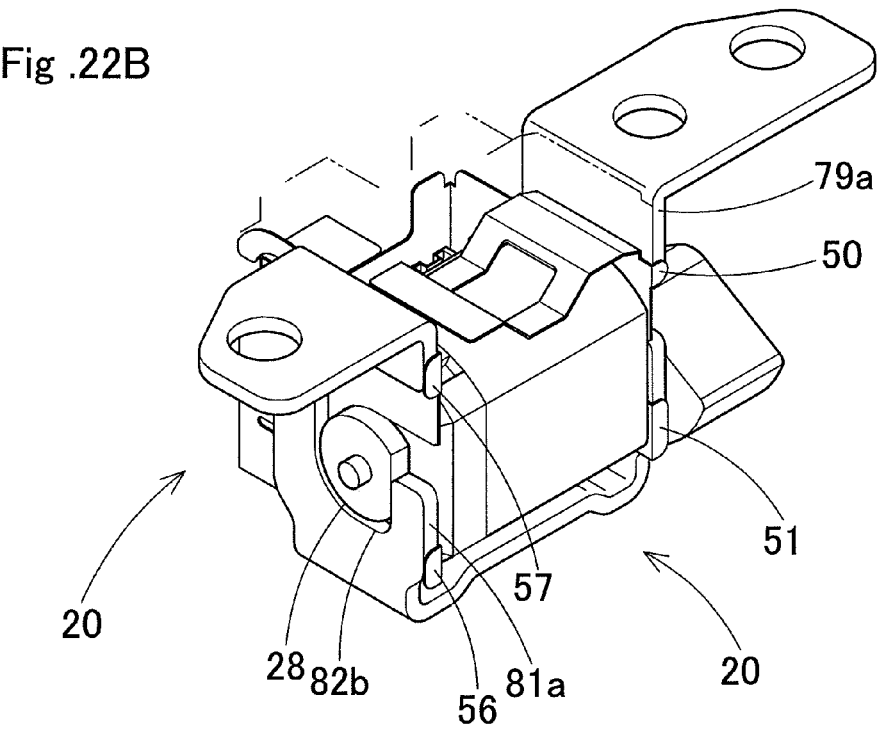

Thereafter, as shown in FIGS. 7, 8, 21 and 22A, the mounting bracket 75 is assembled with the vibration motor 21 on which the clip 40 is mounted. Firstly, the pivotally-support section 27, which protrudes out of the assembling recess 47 of the assembling plate section 46 of the clip 40, is inserted into the insertion opening 80a of the holding recess 80 in the holding wall 79 of the mounting bracket 75. In the meantime, the pivotally-support section 28 is inserted into the insertion opening 82a of the holding recess 82. Then as shown in FIG. 22B, the pivotally-support sections 27 and 28 are moved downward and set in the fit-in regions 80b and 82b of the holding recesses 80 and 82. Thus the mounting bracket 75 is assembled with the vibration motor 21, completing the assembling of the vibration device 20.

At this time, the retaining pawls 49 and 50 of the assembling plate section 46 of the clip 40 are retained at upper and lower regions of the rear end face 79a of the holding wall 79 and the retaining pawls 56 and 57 of the assembling plate section 53 are retained at upper and lower regions of the rear end face 81a of the holding wall 81. This configuration will prevent the clip 40 from rotating in a circumferential direction of the axial center X1 of the rotational axis 30 relative to the holding section 76 of the mounting bracket 75. Further, if the retaining pawls 49, 50, 56 and 57 are retained by the rear end faces (retained regions) 79a and 81a of the mounting bracket 75, the clip 40 presses the edges 35 and 36 of the circuit substrate 34 toward the motor body 22 with the aid of the contact regions 48b and 55b of the holding stops 48 and 55 which oppose the retaining pawls 49, 50, 56 and 57 in a front and rear direction, thus preventing the circuit substrate 34 from coming off the motor body 22 in a secure fashion.

Moreover, at completion of the assembling of the vibration device 20, the distant region 24 of the motor body 22 abuts against the pressing plane 77a of the connecting wall 77 of the holding section 76 of the mounting bracket 75.

Now the assembling of the steering wheel W is described. Firstly, the mounting tongue 84 of the mounting bracket 75 is located at the mounting base 6 of the mounting section 5 of the steering wheel body 1, while the mounting tongue 88 is located at the mounting base 7. At this time, by putting the projection 6c of the mounting base 6 in the fit-in hole 86 of the mounting tongue 84, the mounting hole 85 and mounting hole 6b, and the mounting hole 89 and mounting hole 7b are matched.

Figure 5B:
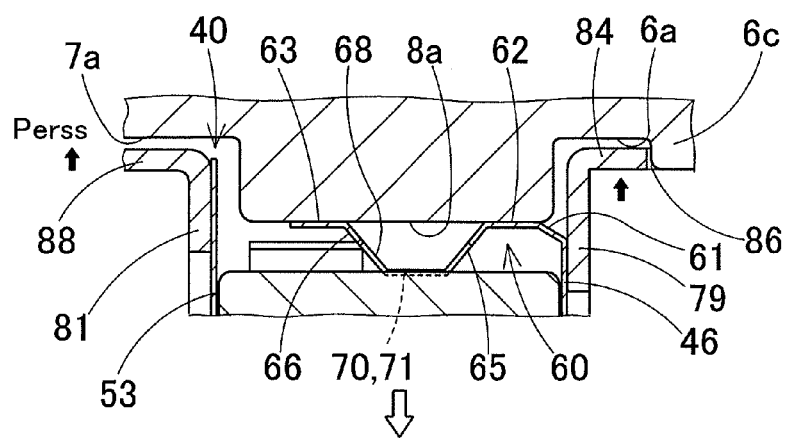
FIG. 5B illustrates the spacer before deforming.

At this time, at the spacer 60, the core-side contact regions 62 and 63 abut against the base plane 8a of the vibration receiving base 8 of the mounting section 5 of the steering wheel body 1 while the supporting edges 71 and 72 of the motor-side contact region 70 support the regions 23c and 23d of the approximate region 23 of the motor body 22, as shown in FIGS. 4B and 5B.

Figure 5C:
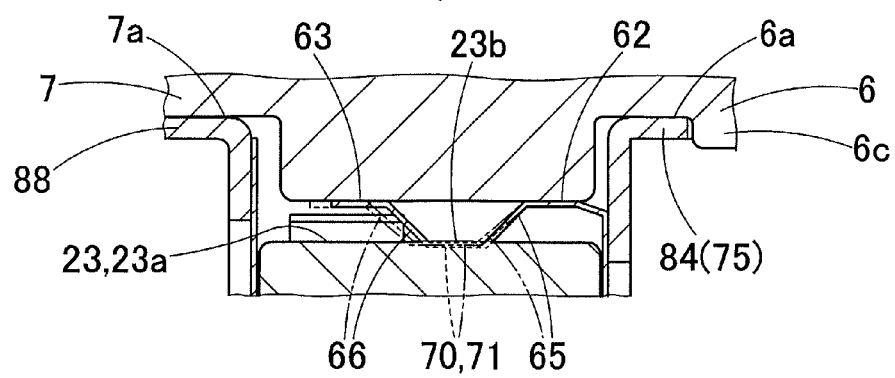
FIG. 5C illustrates the spacer in a deformed state.
Figure 6:
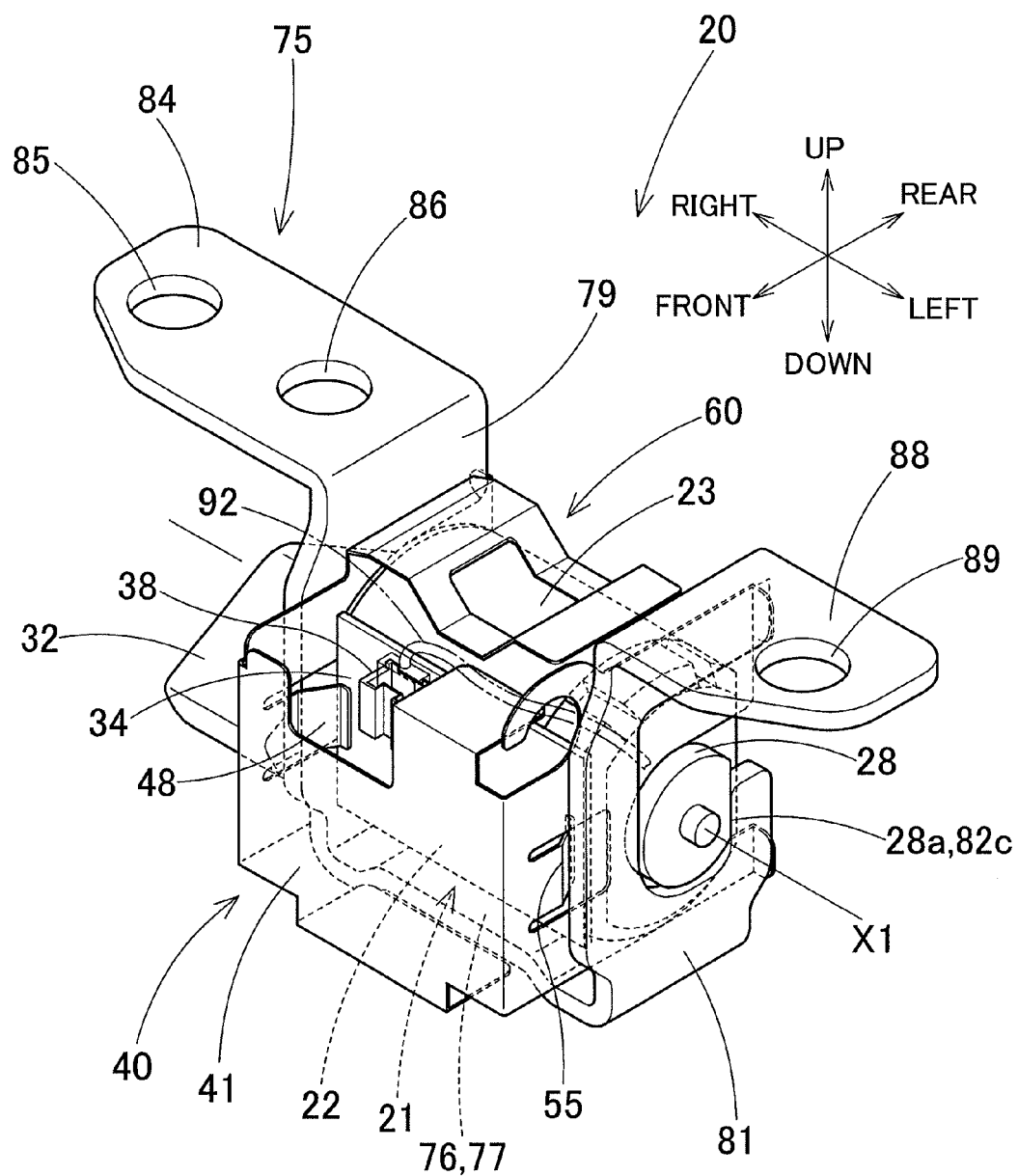
FIG. 6 is a perspective view of the vibration device.

If then the screws (fixing means) 11 are fastened into the mounting holes 85 and 6b and mounting holes 89 and 7b, the vibration device 20 is mounted on the steering wheel body 1 with the pressing plane 77a of the connecting wall 77 of the holding section 76 abutting against the distant region 24 of the motor body 22 and thus having the mounting bracket 75 pressing the approximate region 23 of the motor body 22 against the vibration receiving base 8, as shown in FIGS. 4A and 4B by double-dotted lines, and as shown in FIG. 5C.

At this time, as the screws 11 are fastened, the legs 65 and 66 of the spacer 60 are deformed in such a manner as to open up from each other, in an up and down direction by an amount e (FIG. 4B), and the core-side contact regions 62 and 63 are forcefully pressed against the base plane 8a of the vibration receiving base 8, such that the approximate region 23 of the motor body 22 is connected to the vibration receiving base 8 in such a manner that vibration of the motor body 22 transmits to the vibration receiving base 8 in a synchronized fashion. In other words, the spacer 60 is elastically deformed considerably in an up and down direction by a deforming amount e to such an extent that the spacer 60 no longer deforms by the vibration of the motor body 22, such that the approximate region 23 of the motor body 22 is connected with the vibration receiving base 8 as if it was in direct contact with the vibration receiving base 8.

After the vibration device 20 is mounted on the steering wheel body 1, the lead wire 92 extending from an unillustrated repeater of the steering wheel body 1 is connected to the connector 38 through the hook 58. The lower cover 14 as well as predetermined functional components such as a cruise control device are mounted on the steering wheel body 1, and the steering shaft SS is secured to the boss 3a with a nut N. If then the pad 16 is mounted, the steering wheel W is mounted on a vehicle.

After the steering wheel W is mounted on board, if a predetermined alert system detects a departure of the vehicle from the lane, a voltage is supplied to the vibration motor 21 of the vibration device 20 via the lead wire 92 to rotate the rotational axis 30. Then the eccentric weight 32 rotates along with the rotational axis 30 such that the motor body 22 vibrates and transmits vibration to the vibration receiving base 8, and the vibration receiving base 8 becomes synchronized with the motor body 22 and cause a vibration on the ring section R. As a consequence, the driver holding the ring section R becomes aware of the departure from the lane.

As described above, when the vibration device 20 is assembled, the circuit substrate 34 is firstly connected to the mounting base 25 of the motor body 22 with the terminals 37 of the circuit substrate 34 plugged in the terminal holes 25b of the mounting base 25 of the motor body 22. Then if the clip 40 is mounted on the motor body 22 such that the holding stops (pressing sections) 48 and 55 abut against the circuit substrate 34, and the motor body 22 and the clip 40 are assembled with the mounting bracket 75, the retaining pawls (retaining elements) 49, 50, 56 and 57 of the clip 40 are engaged with and hold the rear end faces 79a and 81a of the mounting bracket 75 so as to help the holding stops 48 and 55 to keep pressing the circuit substrate 34. Accordingly, the assembling of the vibration device will be completed without a fear of disengagement of the circuit substrate 34 from the motor body 22.

That is, assembling of the vibration device 20 can be conducted only by connecting the circuit substrate 34 to the motor body 22, mounting the clip 40 on the motor body 22, and then mounting the mounting bracket 75 on the motor body 22, with the circuit substrate 34 kept attached to the motor body 22 without such fixing means as a screw.

The vibration device 20 assembled as described above can be mounted on the steering wheel body 1 by mounting the mounting bracket 75 on the mounting section 5 of the steering wheel body 1. The lead wire 92 (FIG. 1) has only to be connected to the connector 38 which is formed on the circuit substrate 34 attached to the motor body 22, thus the wiring of the lead wire 92 will be simple as well as the mounting of the vibration device 20 on the steering wheel body 1.

Therefore, the steering wheel W of the embodiment will facilitate the mounting of the vibration device 20 on the steering wheel body 1 as well as the assembling of the vibration device 20.

It will be appreciated that the circuit substrate 34 may preferably be provided with an IC chip for removing an electric noise which would arise at actuation of the vibration motor and affect electronic devices mounted on the steering wheel W.

Although the retaining pawls or retaining elements 49, 50, 56 and 57 of the clip 40 are engaged with and hold the mounting bracket 75 in the foregoing embodiment, the retaining elements 49, 50, 56 and 57 may instead hold the motor body 22, by way of example hold a flat region 26 located on an opposite side of the mounting base 25. This configuration will also attain the same working effects as that of the foregoing embodiment.

In the steering wheel W of the foregoing embodiment, the clip 40 is composed of a flat spring material and includes the holding stops 48 and 55 each of which serves as a pressing section that presses the circuit substrate 34 in a direction that the terminals 37 of the circuit substrate 34 are inserted into the terminal holes 25b, and the retaining pawls 49, 50, 56 and 57 each of which serves as a retaining element which holds the mounting bracket 75 in a direction against the direction that the holding stops 48 and 55 press the circuit substrate 34, as shown in FIGS. 11A and 11B.

With this configuration, when the clip 40 is mounted on the motor body 22, the holding stops (or pressing sections) 48 and 55 are firstly located at a position to press the circuit substrate 34 in a direction that the terminals 37 of the circuit substrate 34 are inserted into the terminal holes 25b, i.e., in a direction from the front to rear, and then the clip 40 is mounted on the motor body 22, as shown in FIGS. 7, 8 and 20. Then if the clip 40 and the motor body 22 are assembled with the mounting bracket 75, the retaining pawls (retaining elements) 49, 50, 56 and 57 of the clip 40 hold the mounting bracket 75 in a direction against the direction that the holding stops 48 and 55 press the circuit substrate 34, i.e., in a direction from the rear to front (FIG. 22). At this time, since the clip 40 is composed of a flat spring plate material, the holding stops 48 and 55 are elastically deformed as shown in FIG. 11B so as to press the circuit substrate 34 against an unplug-direction of the terminals 37 out of the terminal holes 25b, thus prevents the circuit substrate 34 from being disengaged from the motor body 22 smoothly. Further, the clip 40 will also be prevented from being disengaged from the mounting bracket 75 and steadily assembled with the mounting bracket 75 because of a repulsive force of the holding stops 48 and 55 and retention by the retaining pawls 49, 50, 56 and 57.

As shown in FIGS. 5A to 6, 14 to 17, 20 and 21, in the steering wheel W of the foregoing embodiment, the clip 40 includes a pair of assembling plate sections 46 and 53 which are opposed to each other in a direction of the rotational axis 30 of the vibration motor 21 and abut against opposite end planes 22b and 22c of the motor body 22, and a connection plate section 41 which connects the assembling plate sections 46 and 53 together and covers the circuit substrate 34, thus the clip 40 has a generally U-shaped sectional shape. Each of the assembling plate sections 46 and 53 includes the holding stop 48/55 which abuts against opposite edge 35/36 of the circuit substrate 34 connected to the mounting base 25, the assembling recess 47/54 which receives the pivotally-support section (i.e., projected section) 27/28 of the motor body 22 from an opening provided on a side facing away from the connection plate section 41 (i.e., from the rear end) and the retaining pawls 49, 50, 56 and 57 which are formed in a periphery of the opening of the assembling recess 47/54 and are engaged with and hold the rear end face (i.e., retained region) 79a/81a of the mounting bracket 75. As shown in FIGS. 4A to 8, 18, 19, 21 and 22, the mounting bracket 75 includes the holding section 76 which holds the motor body 22 and has a U-shaped sectional shape and a pair of mounting tongues 84 and 88 that extend from opposite ends of the holding section 76 and are mounted on the mounting section 5 of the steering wheel body 1. The holding section 76 includes a pair of holding walls 79 and 81 which are opposed to each other and the connecting wall 77 which connects the holding walls 79 and 81 together, and each of the holding walls 79 and 81 includes the holding recess 80/82 which receives and holds the pivotally-support section (i.e., projected section) 27/28 of the motor body 22 on which the assembling plate sections 46 and 53 of the clip 40 are mounted. Each of the holding recesses 80 and 82 of the holding walls 79 and 81 includes the insertion opening 80a/82a which is formed along a direction that the edge 35/36 of the circuit substrate 34 presses the holding stop 48/55 of the clip 40 (i.e., toward the front from the rear) for receiving the pivotally-support section 27/28 of the motor body 22 and the fit-in region 80b/82b which holds the pivotally-support section 27/28 in a fitted fashion. The fit-in region 80b and 82b are so formed as to bend at an end of the insertion opening 80a and 82a in a direction perpendicular to a direction that the holding stops 48 and 55 press the circuit substrate 34 (i.e., in a direction perpendicular to a front and rear direction). The holding stops 48 and 55 and the retaining pawls 49, 50, 56 and 57 of the clip 40 are located distant from each other in a direction that the terminals 37 of the circuit substrate 34 are inserted into the terminal holes 25b such that the retaining pawls 49, 50, 56 and 57 are engaged with and hold the rear end faces (the retained regions) 79a and 81a located on the holding walls 79 and 81 of the mounting bracket 75 and the holding stops 48 and 55 press the edges 35 and 36 of the circuit substrate 34 connected to the mounting base 25 of the motor body 22 in a state that the pivotally-support sections 27 and 28 of the motor body 22 are fitted in the fit-in regions 80b and 82b of the holding recesses 80 and 82 of the holding walls 79 and 81 of the mounting bracket 35.

With the configuration of the foregoing embodiment, the clip 40 can be assembled with the motor body 22 in such a manner that the holding stops 48 and 55 press the edges 35 and 36 of the circuit substrate 34 against the motor body 22 if the pivotally-support sections 27 and 28 formed on the end planes 22b and 22c of the motor body 22 to which the circuit substrate 34 is connected are inserted into the assembling recesses 47 and 54 of the assembling plate sections 46 and 53 of the clip 40. Then if the pivotally-support sections 27 and 28 are inserted into the insertion openings 80a and 82b of the holding recesses 80 and 82 of the holding walls 79 and 81 of the mounting bracket 75 and then set in the fit-in regions 80b and 82b, the vibration motor 21, the clip 40 and the mounting bracket 75 are so assembled that the retaining pawls 49, 50, 56 and 57 are engaged with and hold the rear end faces (the retained regions) 79a and 81a of the mounting bracket 75 while the holding stops 48 and 55 press the edges 35 and 36 of the circuit substrate 34 connected to the mounting base 25 of the motor body 22.

That is, as shown in FIGS. 11A and 11B, the holding stops 48 and 55 and the retaining pawls 49, 50, 56 and 57 prevent the circuit substrate 34 from being disengaged from the motor body 22 while the clip 40 is assembled with the mounting bracket 75. At the same time, with the pivotally-support sections 27 and 28 fitted in the fit-in regions 80b and 82b of the holding walls 79 and 81, the vibration motor 21 is also smoothly assembled with and supported by the mounting bracket 75.

Moreover, in the steering wheel W of the foregoing embodiment, as shown in FIGS. 4A to 8, 18, 19, 21 and 22, each of the insertion openings 80a and 82a of the holding recesses 80 and 82 of the holding walls 79 and 81 of the mounting bracket 75 is located on a lateral (on a rear side) of a region of the holding wall 79/81 between the mounting tongues 84 and 88 and the connecting wall 77 and each of the fit-in regions 80b and 82b is so formed as to bend toward the connecting wall 77 (i.e., downwardly) from the insertion openings 80a and 82a. The connecting wall 77 abuts against the distant region 24 of the outer circumference 22a of the motor body 22 in a state that the pivotally-support sections 27 and 28 of the motor body 22 are set in the fit-in regions 80b and 82b of the holding recesses 80 and 82. Further, the clip 40 includes a spacer 60 which extends from the assembling plate section 46 (i.e., from one of the assembling plate sections 46 and 53) and is pressed onto the approximate region 23 of the outer circumference 22a of the motor body 22 facing away from the connecting wall 77 and onto the vibration receiving base 8 of the mounting section 5 of the steering wheel body 1 in a state that the mounting tongues 84 and 88 of the mounting bracket 75 are secured to the mounting section 5 of the steering wheel body 1.

With this configuration, if the pivotally-support sections 27 and 28 of the motor body 22 on which the clip 40 is mounted are set in the fit-in regions 80b and 82b, via the insertion openings 80a and 82b, of the holding recesses 80 and 82, the connecting wall 77 of the mounting bracket 75 abuts against and hold the distant region 24 of the outer circumference 22a of the motor body 22. Then if the mounting tongues 84 and 88 of the mounting bracket 75 are secured to the mounting bases 6 and 7 of the mounting section 5 of the steering wheel body 1, the motor body 22 supported by the connecting wall 77 is brought into contact with the vibration receiving base 8 of the mounting section 5 of the steering wheel body 1 with the spacer 60 disposed therebetween in an elastically deformed state, as shown in FIGS. 4B, 5B and 5C. That is, the spacer 60, which is elastically deformable for a deforming amount e, will fill any gaps due to a dimension error between the outer circumference 22a of the motor body 22 and the vibration receiving base 8 of the mounting section 5 of the steering wheel body 1, and help transmit vibration of the motor body 22 to the vibration receiving base 8.

Therefore, with the foregoing embodiment, vibration of the motor body 22 generated by rotation of the weight 32 will directly transmit to the mounting section 5 formed on a region of the core 2 continuous with the ring section R and vibrate the ring section R in an effective fashion.

Furthermore, in the foregoing embodiment, as shown in FIGS. 4A to 5C, 20 and 21, the spacer 60 includes the housing hole 68 which houses the circular-arc planar outer circumference 23a of the outer circumference 22a of the motor body 22 located between the end planes 22b and 22c, and opposing edges of the housing hole 68 serve as supporting edges 71 and 72 which abut against the circular-arc planar outer circumference 23a of the motor body 22 and abut against the regions 23c and 23d of the circular-arc planar outer circumference 23a disposed on both front and rear sides of the projecting top (most projected region) 23b of the circular-arc planar outer circumference 23a in a cross-sectional surface of the motor body 22 taken in a direction perpendicular to the rotational axis 30.

With this configuration, when mounting the clip 40 on the motor body 22, if the circular-arc planar outer circumference 23a of the motor body 22 is set in the housing hole 68 of the spacer 60, the supporting edges 71 and 72 of the housing hole 68 abut against the regions 23c and 23d which are disposed on both sides of the projecting top 23b of the circular-arc planar outer circumference 23a, and prevent the clip 40 from being disengaged from the motor body 22 in a direction perpendicular to the axial center X1 of the rotational axis 30. That is, the clip 40 is assembled with the motor body 22 in a secure fashion with the holding stops 48 and 55 brought into contact with the edges 35 and 36 of the circuit substrate 34 and with the supporting edges 71 and 72 abutting against and holding the regions 23c and 23d located on both sides of the projecting top 23b on the circular-arc planar outer circumference 23a of the motor body 22. Accordingly, in a subsequent process of assembling the motor body 22 and the mounting bracket 75, there will be no need to hold the clip 40, thereby facilitating the assembling of the vibration device 20.

In the steering wheel W of the foregoing embodiment, the vibration motor 21 is secured to the mounting section 5 provided on the transverse bar 4f of the spoke core section 4 of the spoke SB in such a manner that the axial center X1 of the rotational axis 30 of the vibration motor 21 extends in parallel to the ring forming plane RP of the ring section R.

When the vibration motor 21 is actuated, since the leading end 30a of the rotational axis 30 with the eccentric weight 32 rotates about the axial center X1 of the rotational axis 30 while flexing, the motor body 22 vibrates in a direction perpendicular to the rotational axis 30. With the above-described configuration, since the axial center X1 of the rotational axis 30 is arranged in parallel to the ring forming plane RP of the ring section R, the motor body 22 vibrates in a direction perpendicular to the ring forming plane RP, and so does the vibration receiving base 8 synchronized with the motor body 22. Further, since the ring section R is supported by the boss 3a of the boss section B secured to the steering shaft SS in a cantilevered fashion through the medium of the spokes S, if the vibration receiving base 8 vibrates in a direction perpendicular to the ring forming plane RP, the ring section R vibrates easily in a direction of the steering shaft SS. Furthermore, since the vibration of the motor body 22 occurs at the vibration receiving base 8 which is located on the spoke SB between the ring section R and the boss 3a of the boss section B as the supporting point, as shown in FIG. 3, the vibration transmits to the ring section R in an amplified fashion in direct proportion of a distance BM between the boss 3a and the motor body 22 to a distance BR between the boss 3a and the ring section R.

As a consequence, the configuration of the foregoing embodiment will help generate a great (strong) and sufficiently perceivable vibration at the ring section R even if the vibration of the vibration motor 21 is small (weak).

Without considering such advantageous effects, the axial center X1 of the rotational axis 30 may be arranged parallel to an axial center of the steering shaft SS, instead of parallel to the ring forming plane RP of the ring section R.

In the foregoing embodiment, the clip 40 includes the spacer 60 located between the outer circumference 22a of the motor body 22 and the vibration receiving base 8 of the mounting section 5 of the steering wheel body 1 in an integrated fashion. However, the clip may be configured without a spacer if a mounting bracket with a holding section is capable of pressing the distant region 24 of the motor body 22 against the vibration receiving base 8 such that the approximate region 23 of the motor body 22 contacts the vibration receiving base 8 directly and vibration of the motor body 22 transmits to the vibration receiving base 8.

What is claimed is:

1. A steering wheel comprising a steering wheel body provided with a ring section for holding for steering and a vibration device that transmits vibration to a driver holding the ring section, the vibration device comprising:
    a vibration motor that includes a motor body, a rotational axis protruding out of the motor body and an eccentric weight attached to the rotational shaft, the motor body including a mounting base provided with a terminal hole;
    a mounting bracket that holds the motor body and mounts the vibration motor on a mounting section of the steering wheel body;
    a circuit substrate that includes a connector to which a lead wire is connected for feeding the vibration motor with an electric power and a terminal which is plugged in the terminal hole of the mounting base of the motor body such that the circuit substrate is connected to the mounting base of the motor body; and
    a clip that is mounted on the motor body and assembled with the mounting bracket together with the motor body, the clip including a pressing section that presses the circuit substrate against the motor body and a retaining element that is engaged with and holds either the mounting bracket or motor body so as to help the pressing section to keep pressing the circuit substrate toward the motor body.

2. The steering wheel of claim 1 wherein:
    the clip is composed of a flat spring material;
    the pressing section is a holding stop which presses the circuit substrate in a direction that the terminal of the circuit substrate is inserted into the terminal hole; and
    the retaining element is a retaining pawl which holds a retained region of the mounting bracket in a direction against the direction that the holding stop presses the circuit substrate.

3. The steering wheel of claim 2, wherein:
    the clip further includes a pair of assembling plate sections that are opposed to each other and abut against opposite end planes of the motor body opposing in a direction of the rotational axis of the vibration motor and a connection plate section that connects the assembling plate sections together and covers the circuit substrate, thus the clip has a generally U-shaped sectional shape;
    the motor body includes on each of the end planes a projected section;
    the holding stop is formed on each of the assembling plate sections in such a manner as to abut against opposite edges of the circuit substrate connected to the mounting base;
    each of the assembling plate sections includes an assembling recess that receives the projected section of the motor body from an opening of the assembling recess provided on a side facing away from the connection plate section;
    the retaining pawl is formed in a periphery of the opening of each of the assembling recesses;
    the mounting bracket includes a holding section that holds the motor body and has a U-shaped sectional shape and a pair of mounting tongues that extend from opposite ends of the holding section and are mounted on the mounting section of the steering wheel body;
    the holding section of the mounting bracket includes:
        a pair of holding walls that are opposed to each other, each of the holding walls including a holding recess which receives and holds the projected section of the motor body on which the assembling plate sections of the clip are mounted; and
        a connecting wall that connects the holding walls together;
    each of the holding recesses of the holding walls includes:
        an insertion opening for receiving the projected section of the motor body, the insertion opening being formed along a direction that the edges of the circuit substrate press the holding stops of the clip, and
        a fit-in region into which the projected section of the motor body is fitted, the fit-in region being so formed as to bend at an end of the insertion opening in a direction perpendicular to a direction that the holding stops press the circuit substrate; and the holding stops and the retaining pawls of the clip are located distant from each other in a direction that the terminal of the circuit substrate is inserted into the terminal hole such that the retaining pawls of the clip are engaged with and hold the retained regions located on the holding walls of the mounting bracket and the holding stops press the edges of the circuit substrate connected to the mounting base of the motor body in a state that the projected sections of the motor body are fitted in the fit-in regions of the holding recesses of the holding walls of the mounting bracket.

4. The steering wheel of claim 3 wherein:

each of the insertion openings of the holding recesses of the holding walls of the mounting bracket is located on an edge of the holding wall and each of the fit-in regions is so formed as to bend toward the connecting wall from the insertion opening;

the connecting wall abuts against an outer circumference of the motor body in a state that the projected regions of the motor body are set in the fit-in regions of the holding recesses; and the clip further includes a spacer that extends from one of the assembling plate sections and is pressed onto a region of the outer circumference of the motor body facing away from the connecting wall of the mounting bracket and onto the mounting section of the steering wheel body in a state that the mounting tongues of the mounting bracket are secured to the mounting section of the steering wheel body.

5. The steering wheel of claim 4, wherein:

the spacer includes a housing hole that houses a circular-arc planar region of the outer circumference of the motor body located between the end planes; and opposing edges of the housing hole serve as supporting edges that abut against regions in the circular-arc planar region of the outer circumference of the motor body which are disposed on both sides of a most projected region of the circular-arc planar region in a cross-sectional surface of the motor body taken in a direction perpendicular to the rotational axis.

* * * * *